(12) United States Patent
Grady

(10) Patent No.: US 12,360,578 B2
(45) Date of Patent: Jul. 15, 2025

(54) DRIVE ADAPTOR FOR A DRIVE CARRIER

(71) Applicant: HEWLETT PACKARD ENTERPRISE DEVELOPMENT LP, Spring, TX (US)

(72) Inventor: John R. Grady, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 165 days.

(21) Appl. No.: 18/174,720

(22) Filed: Feb. 27, 2023

(65) Prior Publication Data

US 2024/0288915 A1 Aug. 29, 2024

(51) Int. Cl.
*G06F 1/18* (2006.01)

(52) U.S. Cl.
CPC .................... *G06F 1/187* (2013.01)

(58) Field of Classification Search
CPC ....... G06F 1/187; G06F 1/185; G11B 33/122; G11B 33/1406; G11B 33/1493
See application file for complete search history.

(56) References Cited

U.S. PATENT DOCUMENTS

| | | | | |
|---|---|---|---|---|
| 7,599,183 B2 * | 10/2009 | Dittus | ................ | H05K 7/20727 361/728 |
| 8,300,396 B2 * | 10/2012 | Sun | .......................... | G06F 1/187 248/634 |
| 9,420,718 B2 * | 8/2016 | Du | ........................... | H05K 3/325 |
| 9,510,476 B2 * | 11/2016 | Shirokaze | ................ | G06F 1/183 |
| 9,652,001 B2 * | 5/2017 | Wang | ....................... | G06F 1/187 |
| 9,746,887 B2 * | 8/2017 | Lai | ........................ | G11B 33/123 |
| 9,904,333 B2 * | 2/2018 | Knopf | .................... | G06F 1/1658 |
| 10,321,600 B2 * | 6/2019 | Chang | ................... | H05K 7/1455 |
| 10,416,728 B2 * | 9/2019 | Della Fiora | ........ | H01R 12/7058 |
| 10,470,330 B1 * | 11/2019 | Chen | ..................... | G11B 33/025 |
| 10,537,035 B2 * | 1/2020 | Adrian | ..................... | H05K 5/03 |
| 10,595,443 B2 * | 3/2020 | Chang | ...................... | H05K 7/18 |
| 10,820,415 B1 | 10/2020 | Stenfort | | |

(Continued)

FOREIGN PATENT DOCUMENTS

TW 202103157 A 1/2021

OTHER PUBLICATIONS

Kennedy, P., "E1 and E3 EDSFF to Take Over from M.2 and 2.5 in SSDs," Jun. 29, 2021, 20 pages.

(Continued)

*Primary Examiner* — Rockshana D Chowdhury
(74) *Attorney, Agent, or Firm* — Hewlett Packard Enterprise Patent Department

(57) ABSTRACT

A drive adaptor has an adaptor volume defined between a front wall, a rear wall, a first side wall, and a second side wall. The drive adaptor further includes a third side wall and a fourth side wall disposed between the first and second side walls and connected to the front and rear walls to define a drive compartment within a portion of the adaptor volume. Each of the third and fourth side walls includes one or more retention elements. The drive compartment receives a first form factor drive and the one or more retention elements retains the first form factor drive in the drive compartment. The drive adaptor is received in a drive carrier volume of a drive carrier, where a width of the drive carrier volume conform to a width of a second form factor drive, which is greater than a width of the first form factor drive.

20 Claims, 16 Drawing Sheets

(56) References Cited

U.S. PATENT DOCUMENTS

| | | | |
|---|---|---|---|
| 11,132,034 B2* | 9/2021 | Nguyen | H05K 7/1417 |
| 11,197,387 B2* | 12/2021 | Liu | G11B 33/128 |
| 11,200,920 B1* | 12/2021 | Chang | G11B 33/022 |
| 11,229,140 B2* | 1/2022 | Choyikkunnil | H05K 5/02 |
| 11,432,423 B2* | 8/2022 | Xu | G06F 1/183 |
| 11,714,464 B2* | 8/2023 | Ball | G11B 33/122 361/679.31 |
| 12,079,048 B2* | 9/2024 | O'Donnell | G06F 1/181 |
| 2012/0063080 A1* | 3/2012 | Chou | G06F 1/183 361/679.6 |
| 2015/0043152 A1* | 2/2015 | Zhang | G11B 33/124 312/333 |
| 2015/0201522 A1* | 7/2015 | Jau | H05K 5/0217 312/330.1 |
| 2016/0293224 A1* | 10/2016 | Ehlen | G11B 33/128 |
| 2018/0136701 A1* | 5/2018 | Charpiot | H05K 7/026 |
| 2019/0174642 A1* | 6/2019 | Choyikkunnil | H05K 5/10 |
| 2020/0183862 A1 | 6/2020 | Liu et al. | |
| 2021/0007236 A1 | 1/2021 | Wu et al. | |
| 2024/0288915 A1* | 8/2024 | Grady | G06F 1/187 |

OTHER PUBLICATIONS

Lynn et al., "Introducing the EDSFF E3 Family of Form Factors," White Paper, V. 3.0, Nov. 2022, 7 pages.

* cited by examiner

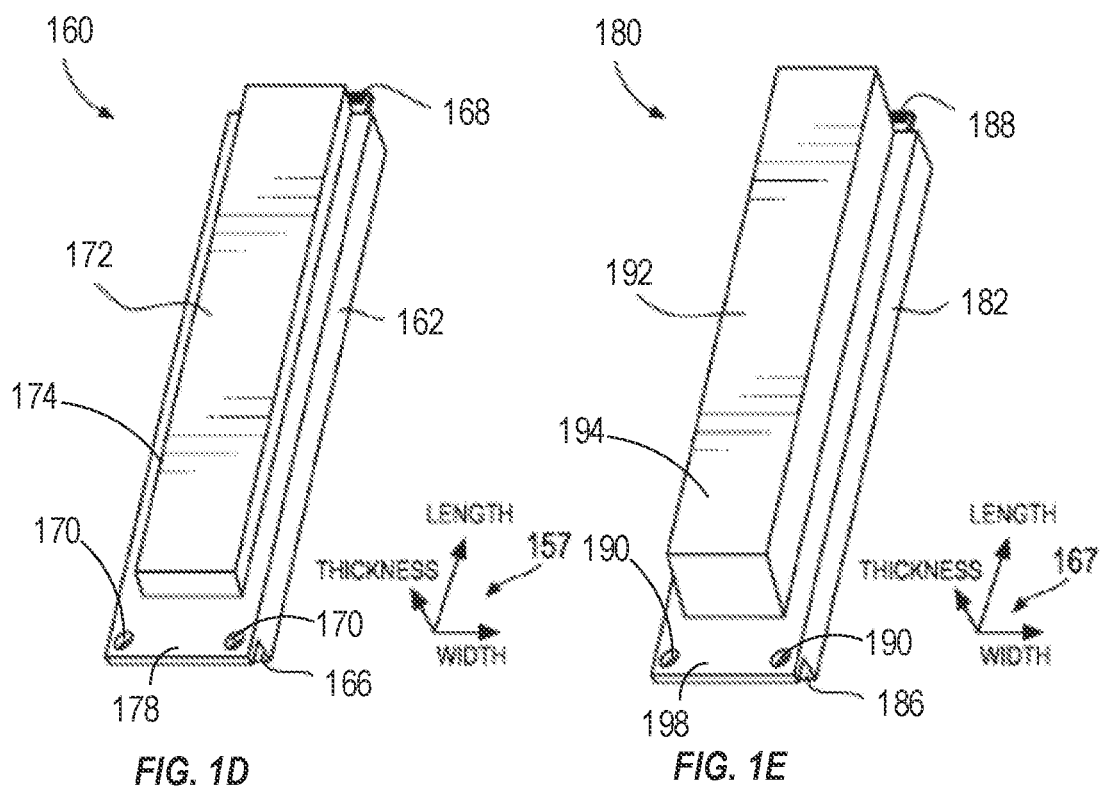

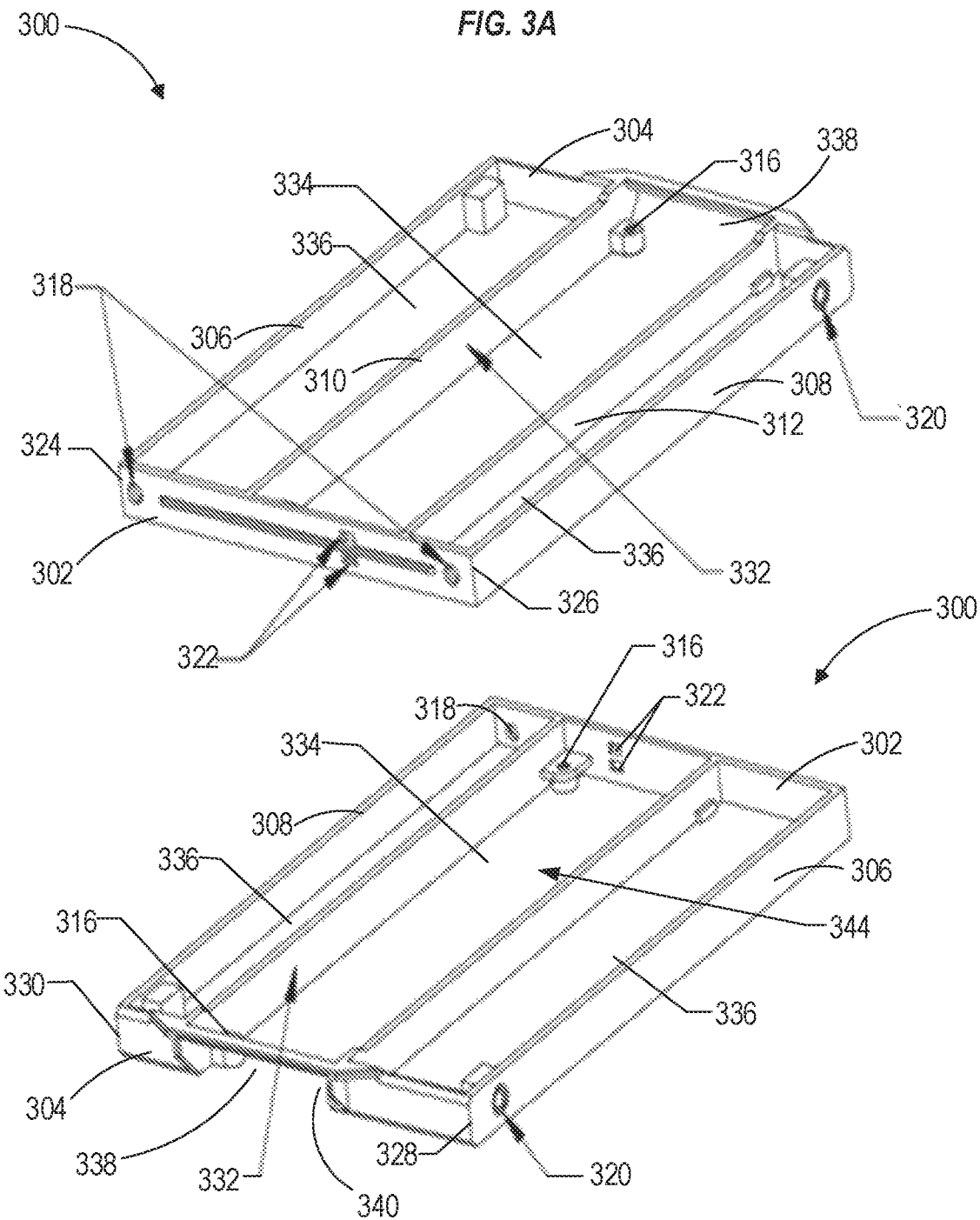
FIG. 3A
FIG. 3B
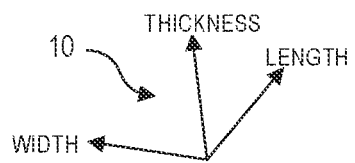

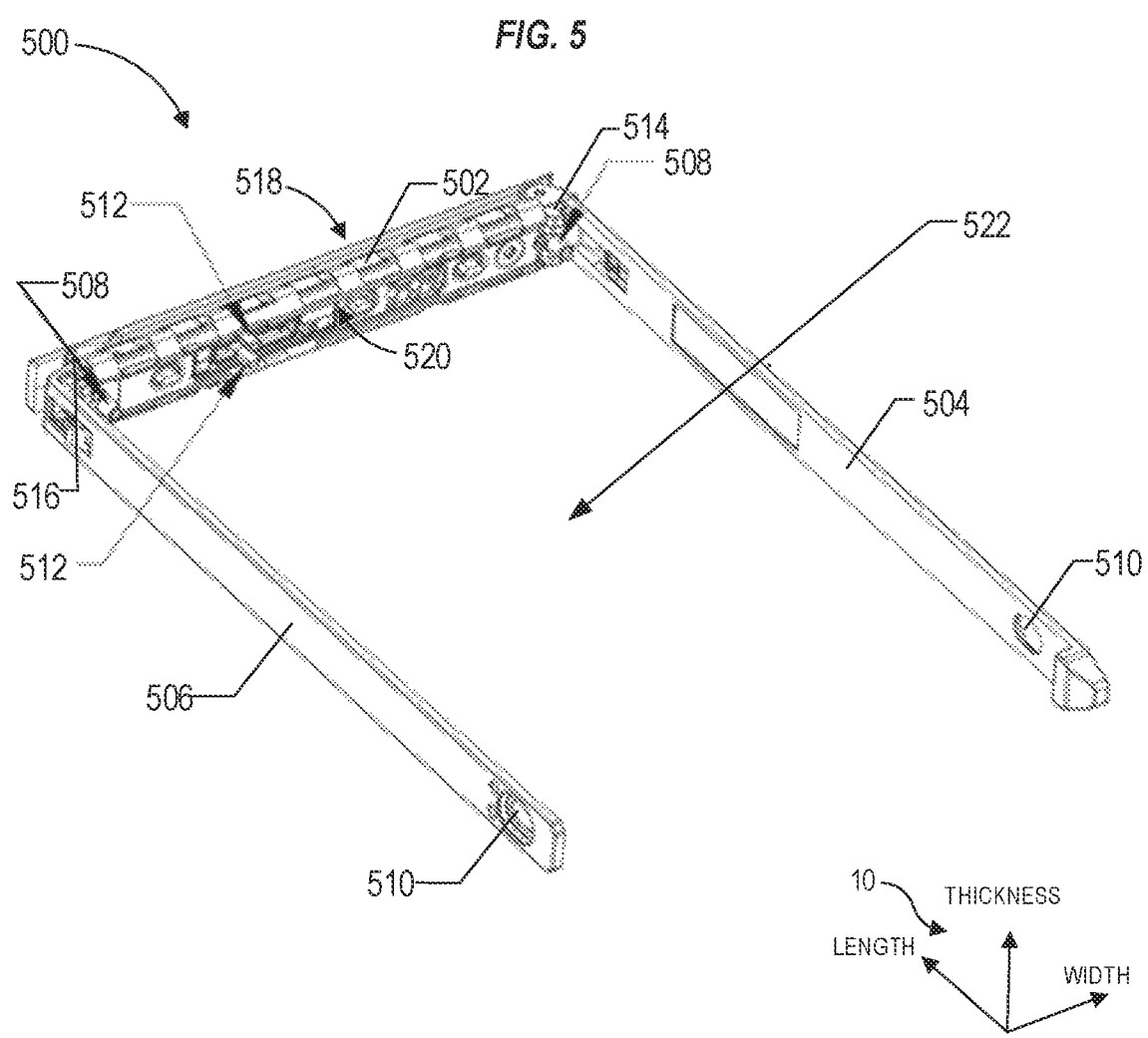

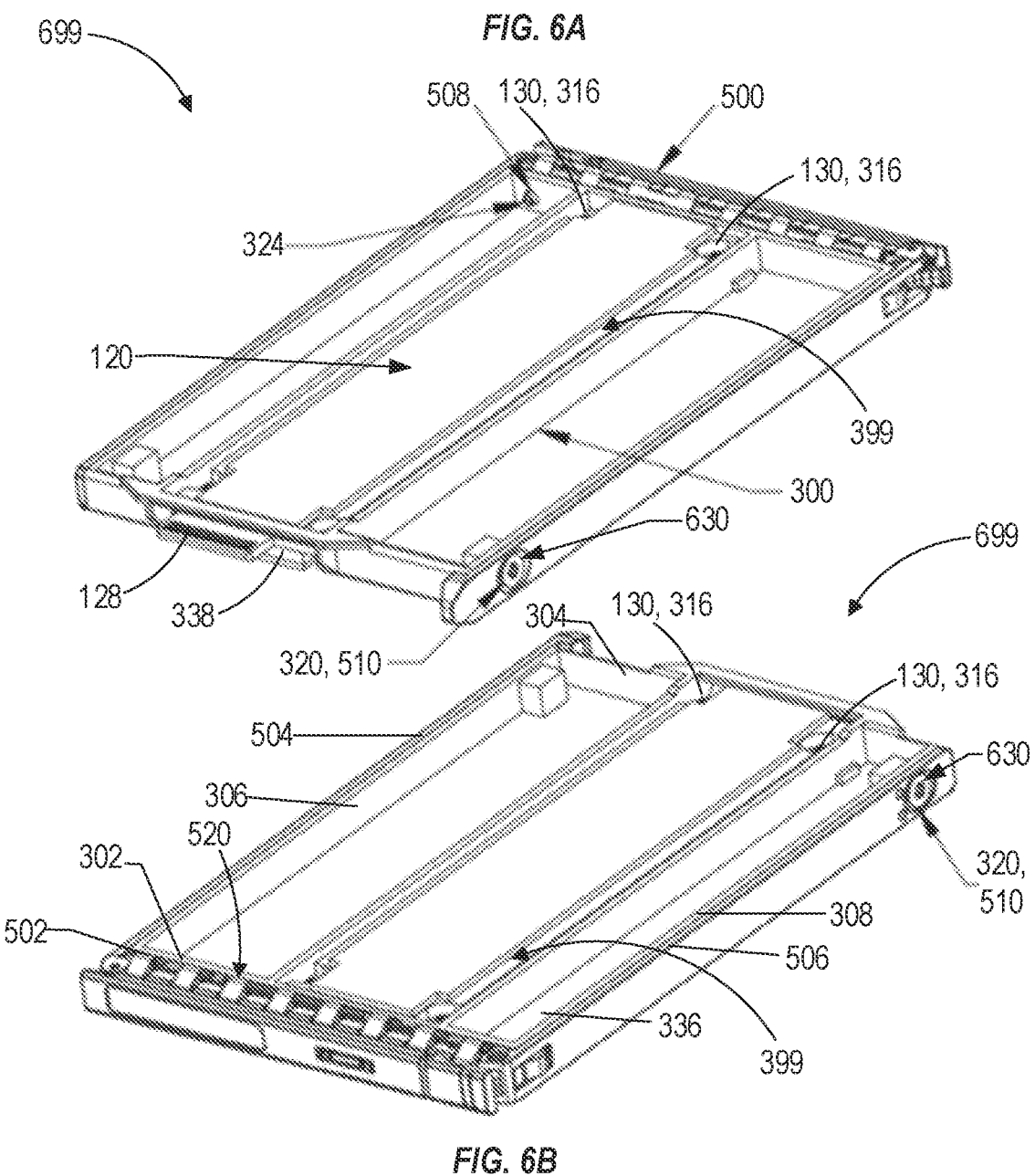

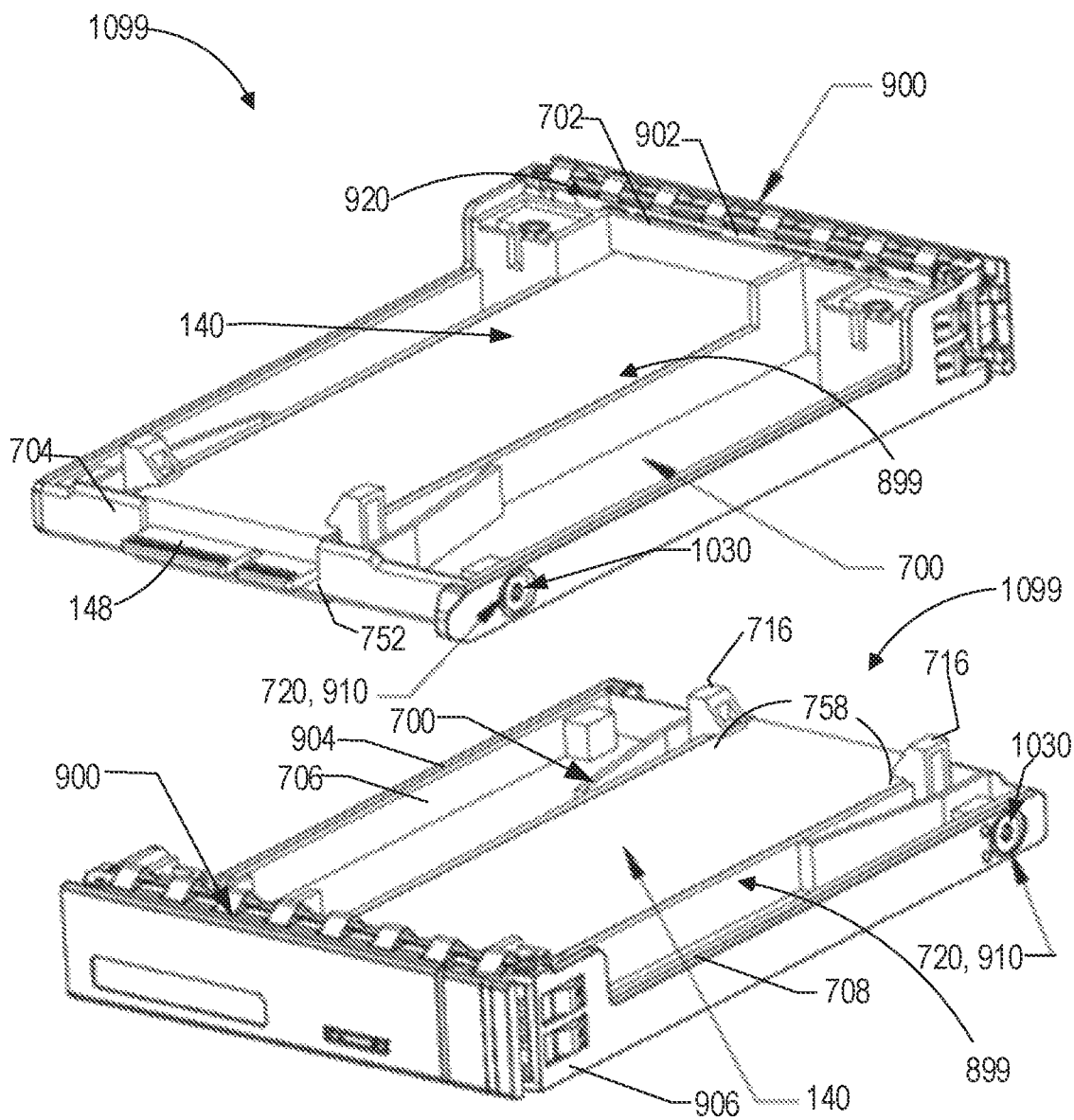

US 12,360,578 B2

1

DRIVE ADAPTOR FOR A DRIVE CARRIER

BACKGROUND

A computing device may include one or more media drives such as, solid state drives ("SSDs"), hard disk drives ("HDDs"), CD ROM drives, or DVD drives to store data. One or more receiving locations can be included in a chassis of the computing device for receiving those media drives, such as one or more bays in a drive cage of the chassis. The media drives can either be directly mounted within those receiving locations, or may be first received in a carrier, which is itself receivable in the receiving location. For example, a drive carrier may be used in the computing device to facilitate installation and uninstallation (e.g., hot-swapping) of the media drive to the computing device. In this manner, the drive carrier may be used to configure the media drive as a field replaceable unit (FRU) to make the media drive hot-pluggable. The drive carrier is therefore configured based on a physical form of the media drive (e.g., SSD), which it has to receive, carry, and mount to the computing system. Since the SSDs are available in differing physical forms, various drive carriers may have to be configured to receive, carry, and mount to the computing device.

BRIEF DESCRIPTION OF THE DRAWINGS

Various examples will be described below with reference to the following figures.

FIG. 1D illustrates a front isometric view of a fourth E1.S drive according to an E1.S 15.00 mm EDSFF specification.

FIG. 1E illustrates a front isometric view of a fifth E1.S drive according to an E1.S 25.00 mm EDSFF specification.

FIG. 3A illustrates a perspective front view of a drive adaptor according to an example of the present disclosure.

FIG. 3B illustrates a perspective rear view of the drive adaptor of FIG. 3A according to an example of the present disclosure.

FIG. 5 illustrates a perspective rear view of a drive carrier according to an example of the present disclosure.

FIG. 6A illustrates an assembled perspective rear view of a drive carrier assembly having the drive adaptor assembly of FIG. 4 and the drive carrier of FIG. 5 according to an example of the present disclosure.

FIG. 6B illustrates an assembled perspective front view of the drive carrier assembly of FIG. 6A according to an example of the present disclosure.

2

Figures 7A, 7B:
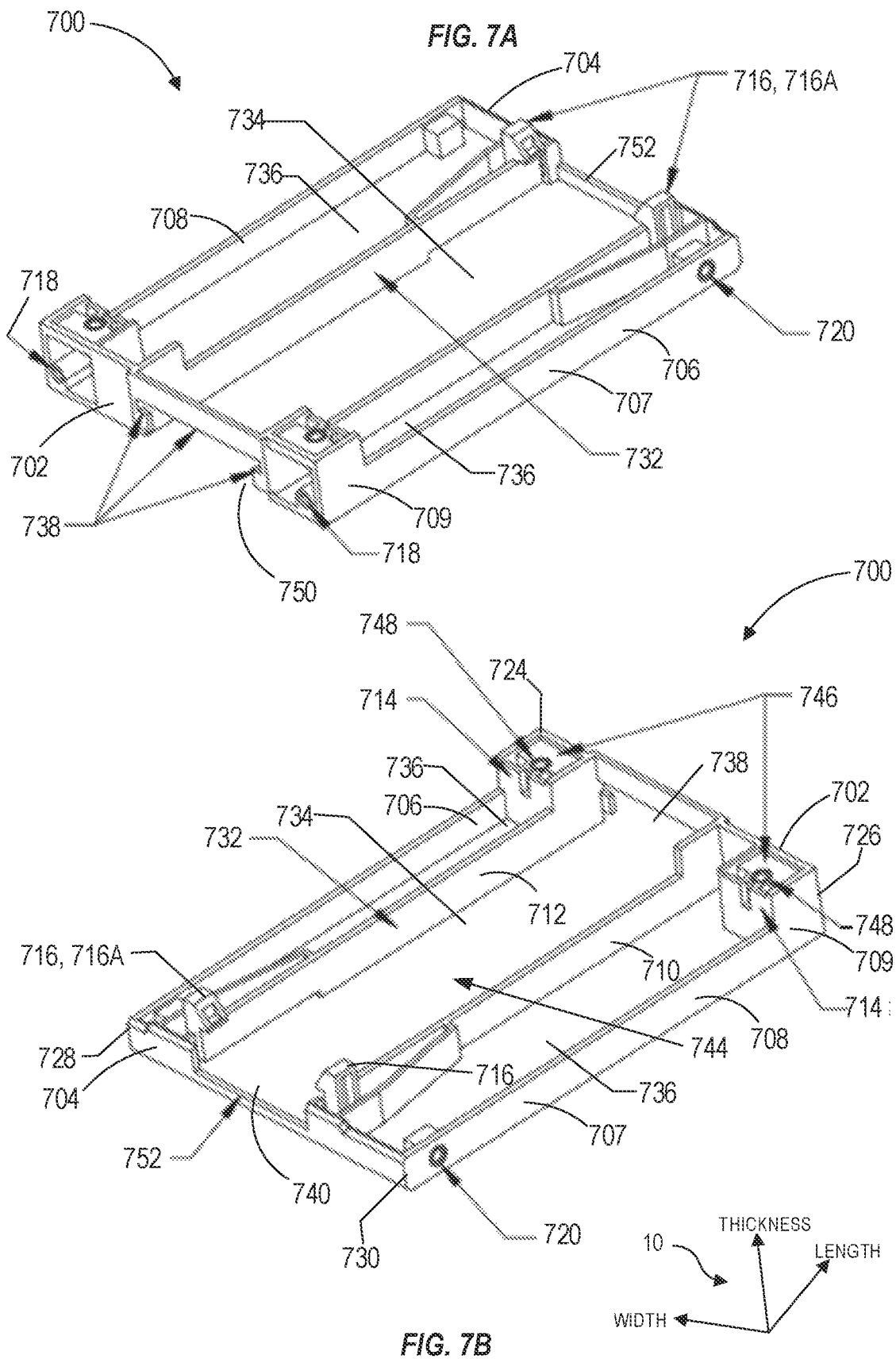
FIG. 7A illustrates a perspective front view of a drive adaptor according to another example of the present disclosure.

FIG. 7B illustrates a perspective rear view of the drive adaptor of FIG. 7A according to another example of the present disclosure.

Figure 1A:
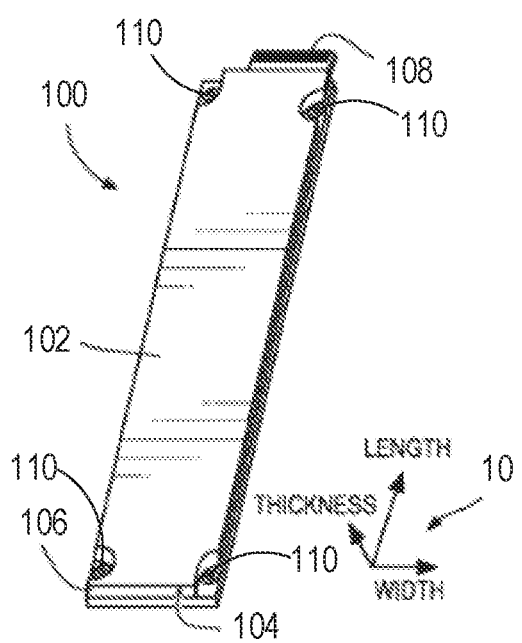
FIG. 1A illustrates a front isometric view of a first E1.S drive according to an E1.S 5.90 mm EDSFF specification.
Figure 1B:
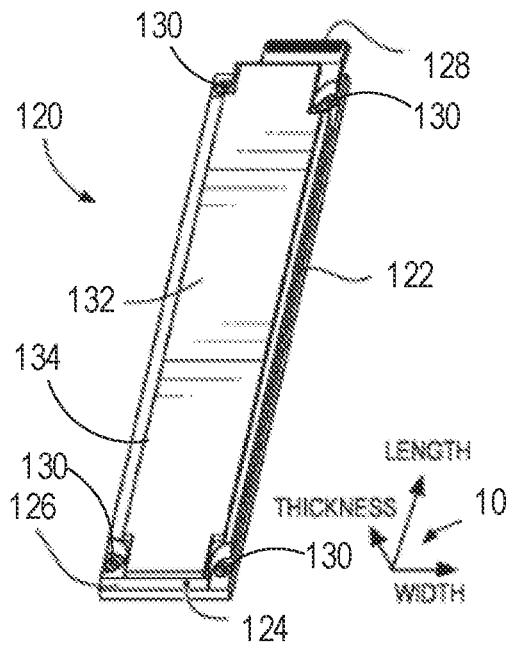
FIG. 1B illustrates a front isometric view of a second E1.S drive according to an E1.S 8.01 mm EDSFF specification.
Figure 1C:
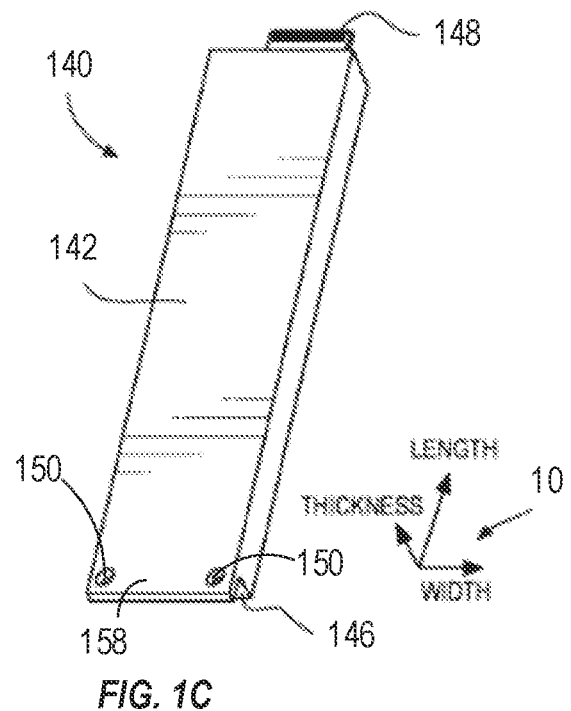
FIG. 1C illustrates a front isometric view of a third E1.S drive according to an E1.S 9.50 mm EDSFF specification.
Figure 8A:
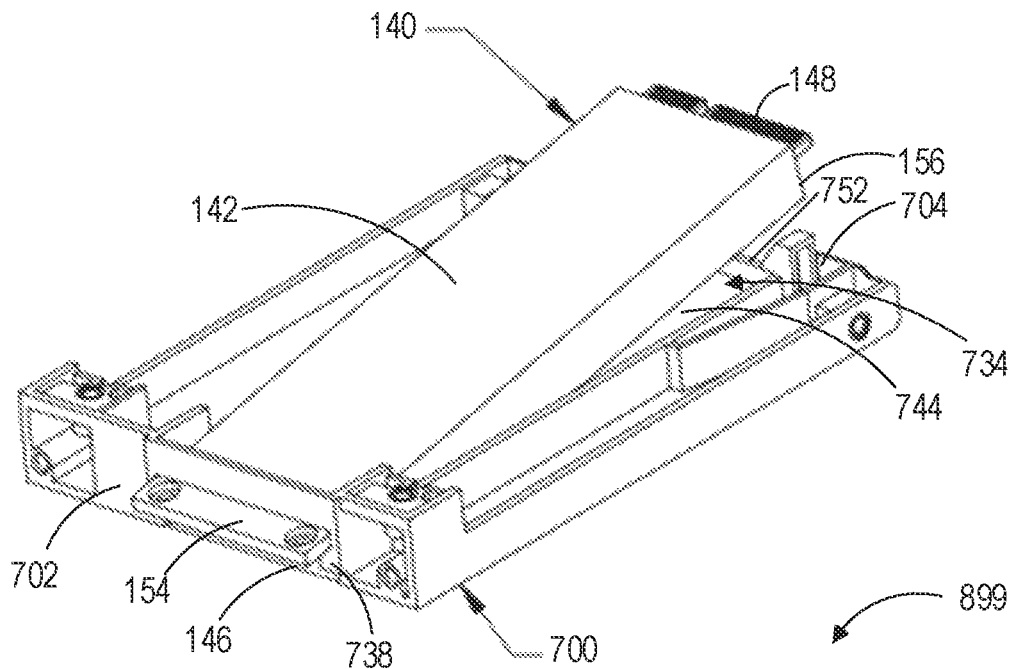

FIG. 8A illustrates an exploded perspective view of a drive adaptor assembly having the third E1.S drive of FIG. 1C and the drive adaptor of FIGS. 7A-7B according to another example of the present disclosure.

Figure 8B:
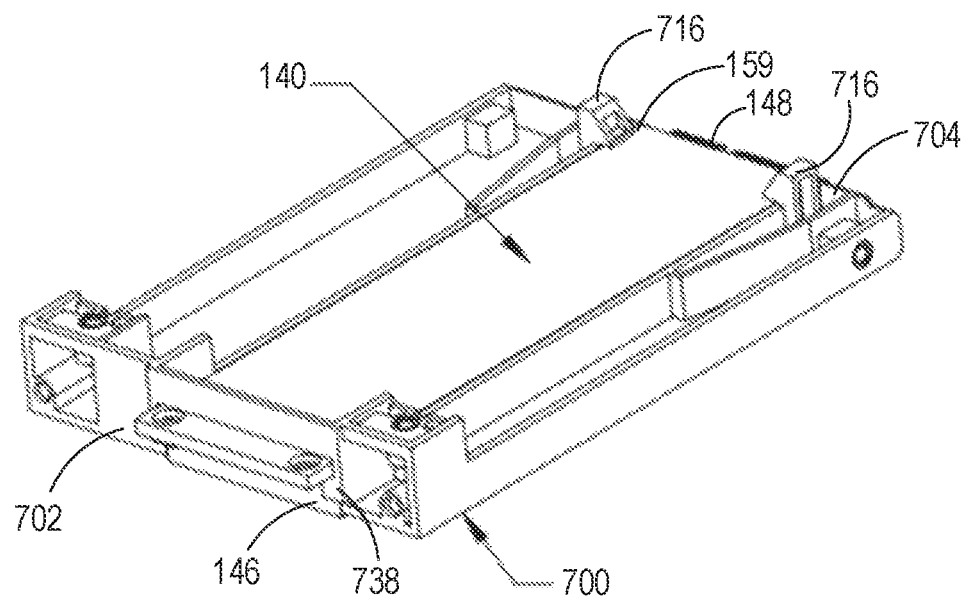

FIG. 8B illustrates an assembled perspective view of the drive adaptor assembly of FIG. 8A according to another example of the present disclosure.

Figure 9:
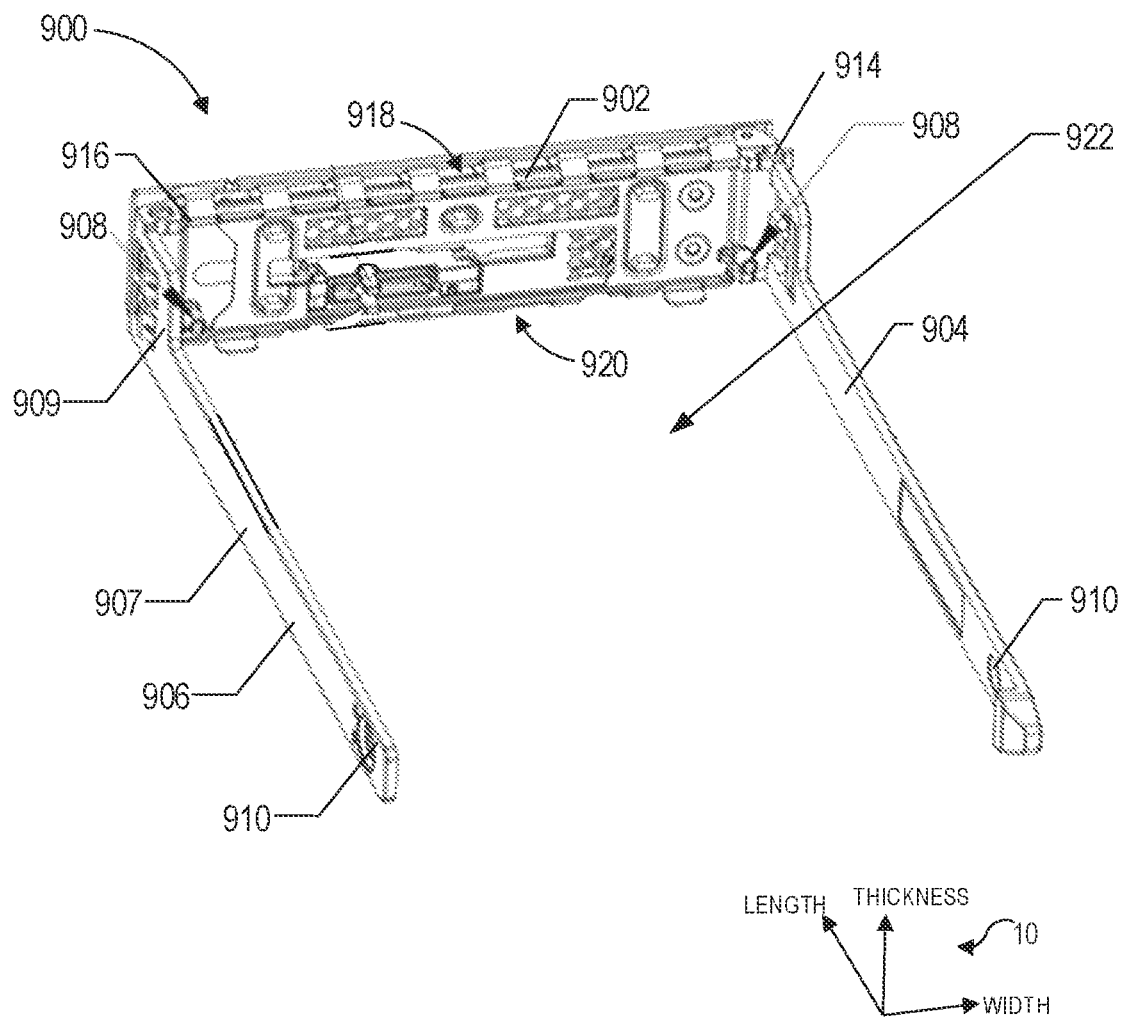

FIG. 9 illustrates a perspective rear view of a drive carrier according to another example of the present disclosure.

FIG. 10A illustrates an assembled perspective rear view of a drive carrier assembly having the drive adaptor assembly of FIGS. 8A-8B and the drive carrier of FIG. 9 according to another example of the present disclosure.

FIG. 10B illustrates an assembled perspective front view of the drive carrier assembly of FIG. 10A according to another example of the present disclosure.

Figure 11A:
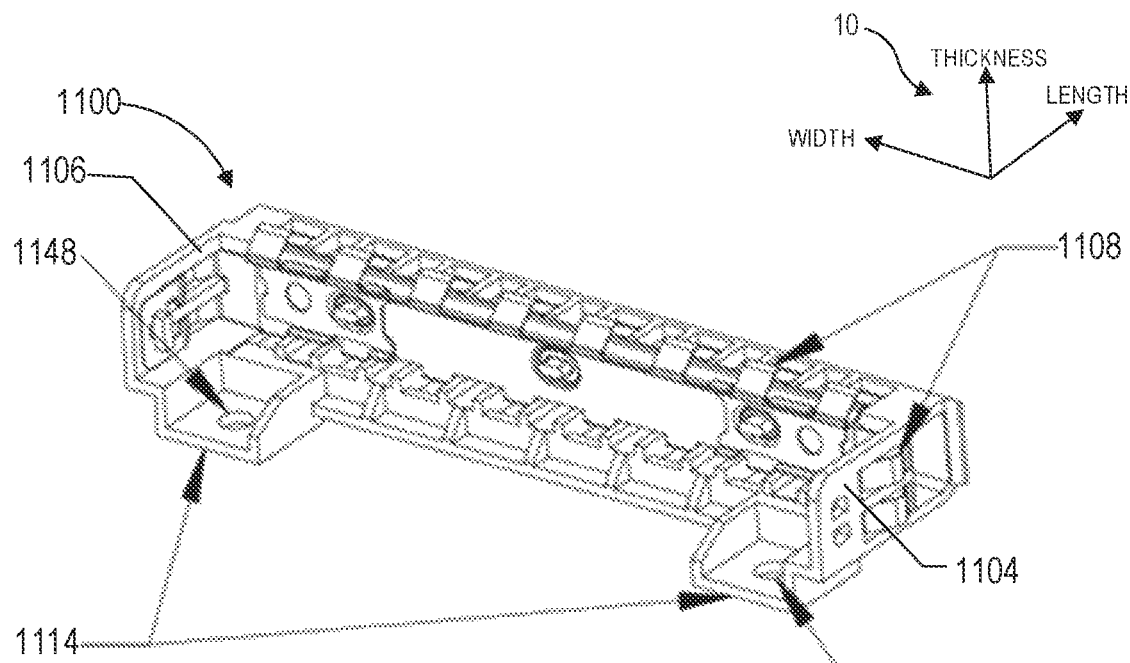

FIG. 11A illustrates a perspective rear view of an auxiliary front element according to another example of the present disclosure.

Figure 11B:
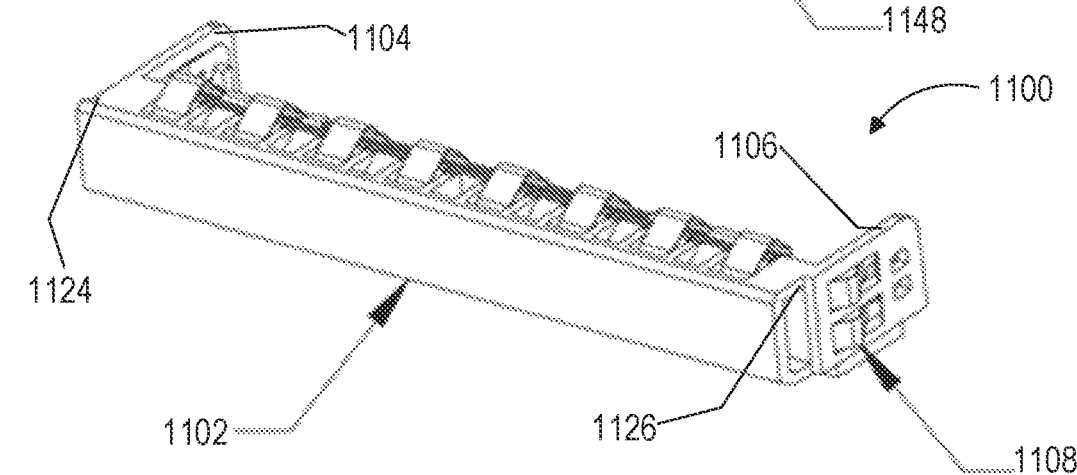

FIG. 11B illustrates a perspective front view of the auxiliary front element of FIG. 11A according to another example of the present disclosure.

Figure 12A:
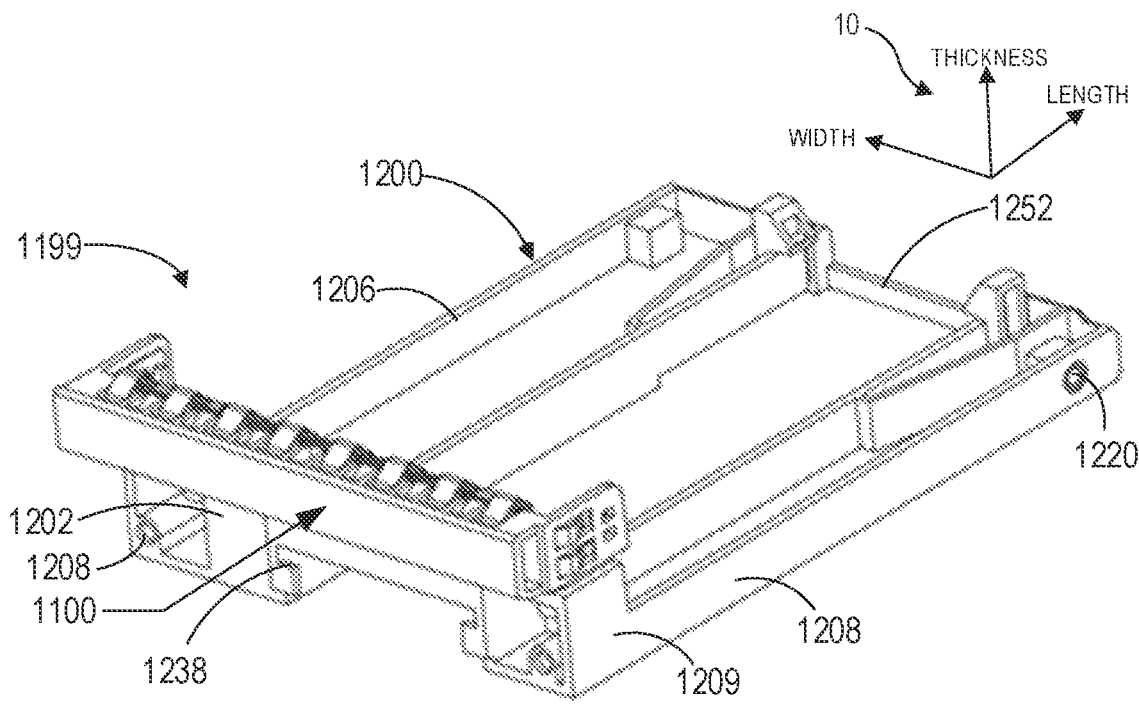

FIG. 12A illustrates a perspective front view of a drive adaptor and the auxiliary front element of FIGS. 11A-11B according to another example of the present disclosure.

Figure 12B:
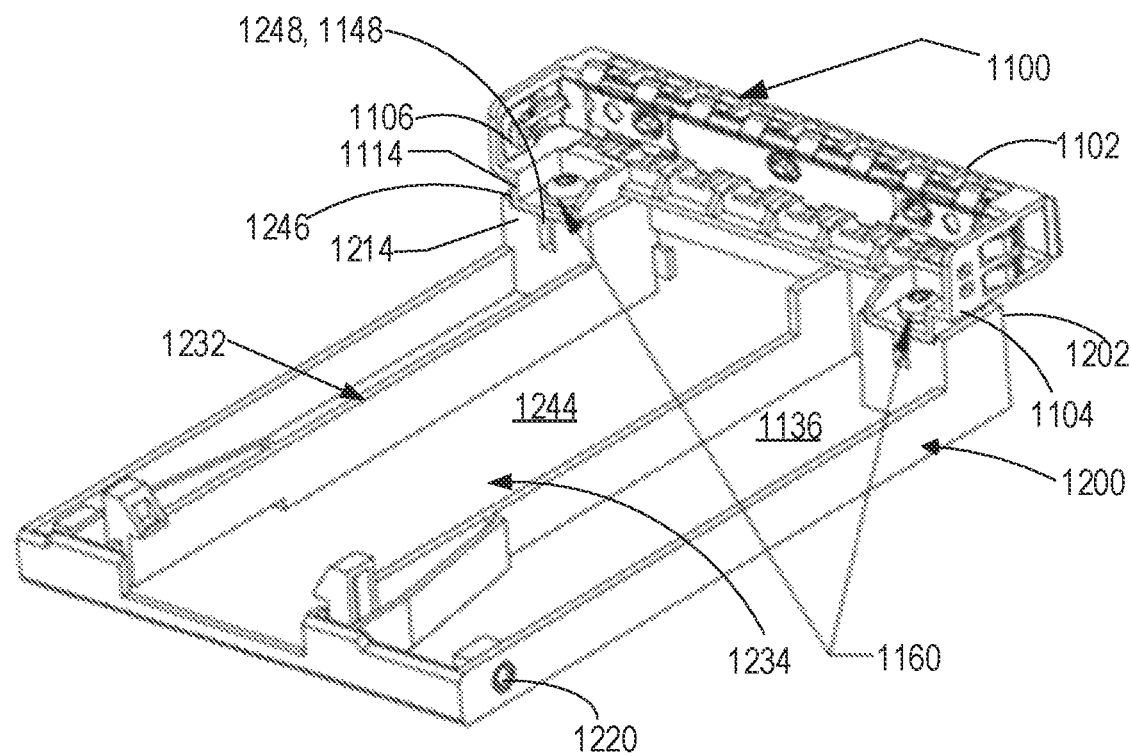

FIG. 12B illustrates a perspective rear view of the drive adaptor and the auxiliary front element of FIG. 12A according to another example of the present disclosure.

Figures 13A, 13B:
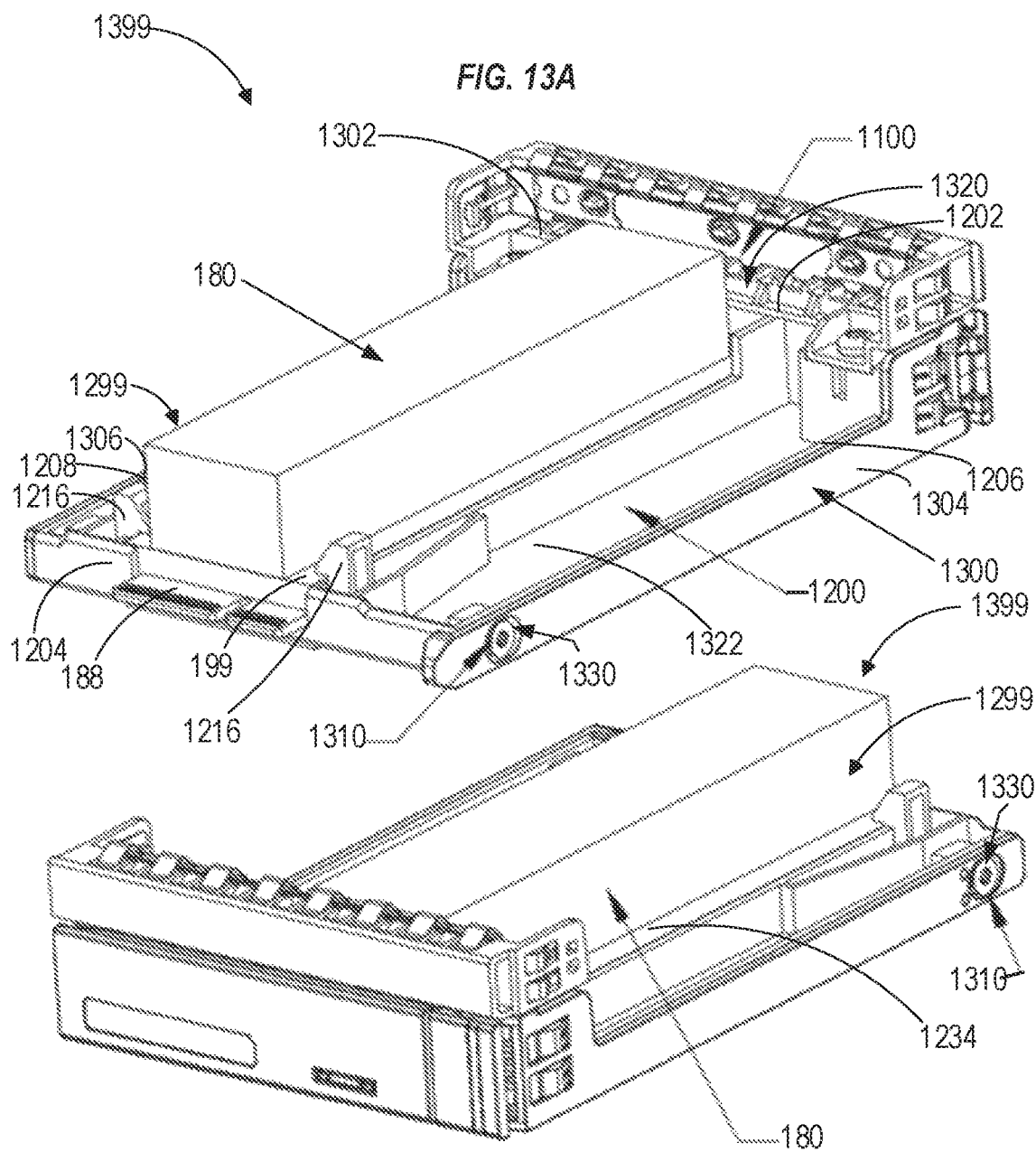

FIG. 13A illustrates an assembled perspective rear view of a drive carrier assembly having a drive carrier and a drive adaptor assembly including the drive adaptor and the auxiliary front element of FIG. 12A and the fifth E1.S drive of FIG. 1E according to another example of the present disclosure.

FIG. 13B illustrates an assembled perspective front view of the drive carrier assembly of FIG. 13A according to another example of the present disclosure.

Figure 14:
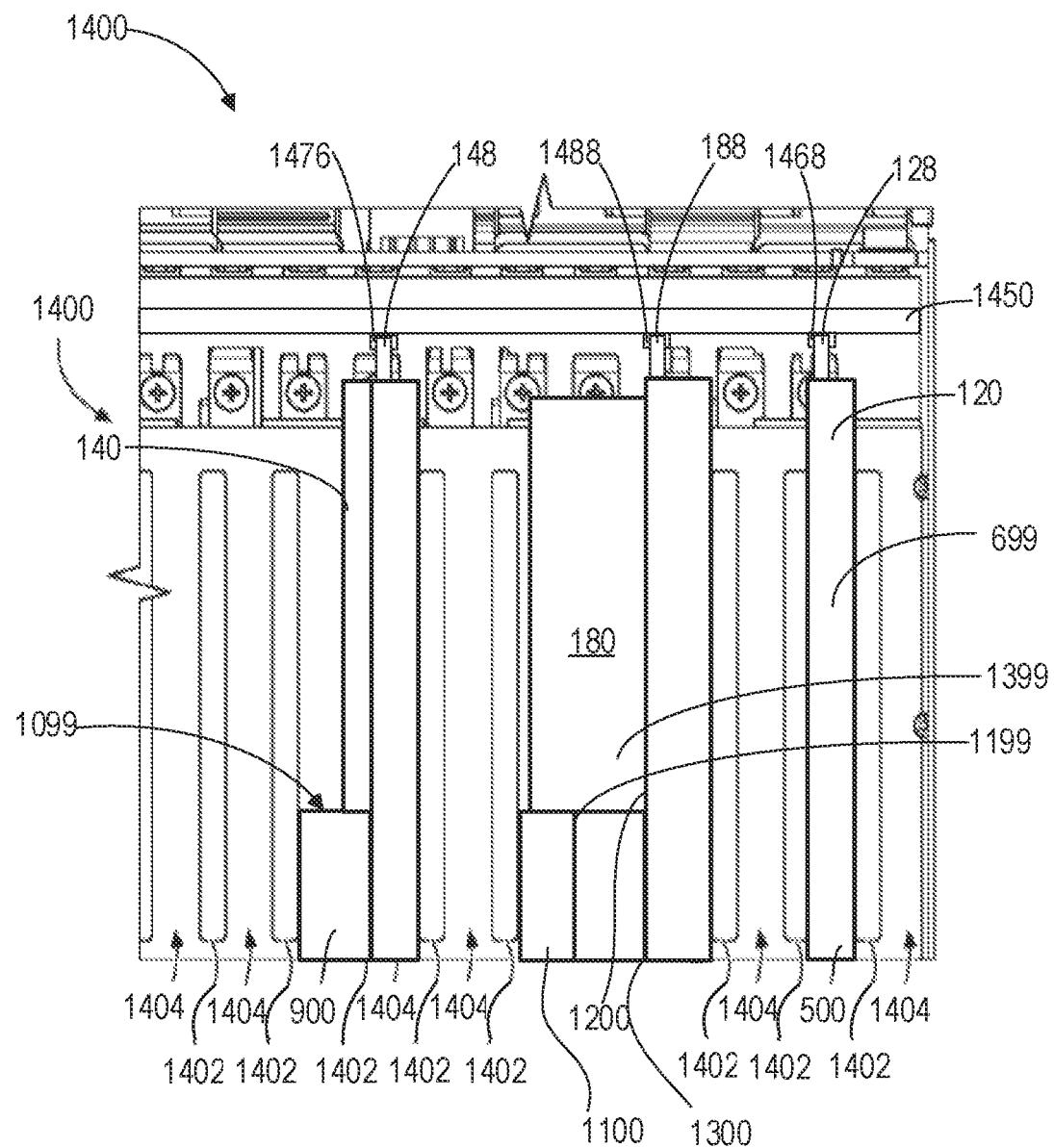

FIG. 14 illustrates a top view of a drive cage of an electronic device having the drive carrier assembly of FIGS. 6A-6B, the drive carrier assembly of FIGS. 10A-10B, and the drive carrier assembly of FIGS. 13A-13B according to another example of the present disclosure.

Figure 15:
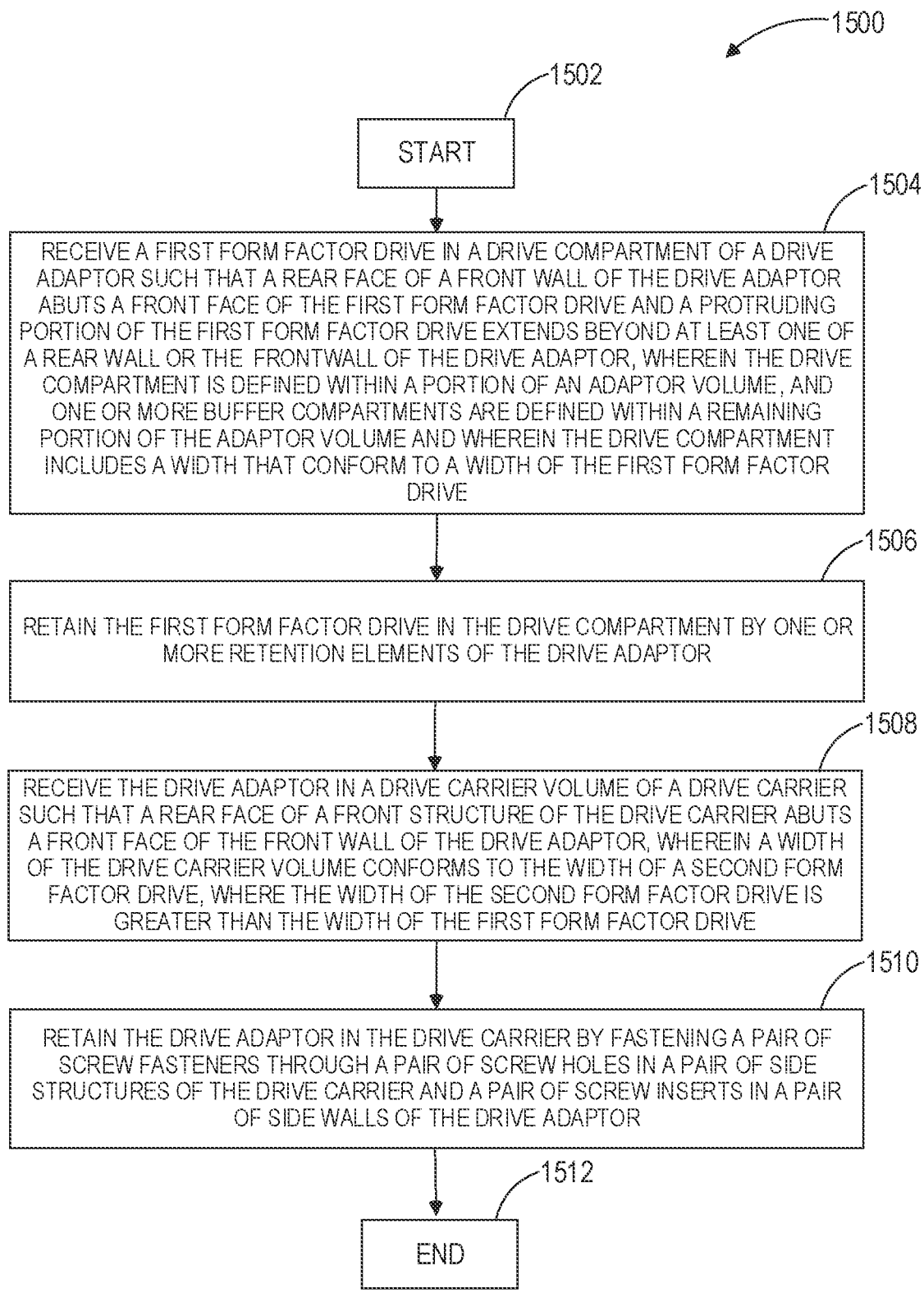

FIG. 15 is a flowchart depicting a method of forming a drive carrier assembly according to one example of the present disclosure.

DETAILED DESCRIPTION

The following detailed description refers to the accompanying drawings. For purposes of explanation, certain examples are described with reference to the components illustrated in FIGS. 1-15. The functionality of the illustrated components may overlap, however, and may be present in a fewer or greater number of elements and components. Moreover, the disclosed examples may be implemented in various environments and are not limited to the illustrated examples. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Drive carriers are used to configure media drives (e.g. SSDs) as FRUs, allowing the media drives to be hot-plugged to an electronic component (e.g., a midplane or backplane circuit board) of an electronic device (e.g., a computing device). The drive carriers are therefore configured based on a physical form of the SSD and are standardized by an industry form factor (e.g., an SSD form factor). For example, an Enterprise & Data Center Standard Form Factor (EDSFF) is designed for use in data centers in servers with storage devices, such as SSDs. As a form factor, it defines specifications such as the dimensions and electrical interfaces the storage devices should have, to ensure data center operators, server manufacturers, and SSD manufacturers, can make products that work with products from multiple manufacturers. Thus, each SSD has a form factor specified in one of the standards in the EDSFF family of standards, including, but not limited to, a form factor specified in SFF-TA-1006, SFF-TA-1007, or SFF-TA-1008. Presently there are various SSDs (e.g., EDSFF drives) defined by the SFF Technology Work Affiliate Technical Work Group of the Storage Networking Industry Association (SNIA). As used herein, an EDSFF drive therefore refers to a type of media drive, such as the SSD. Various SNIA EDSFF drives are specified according to their different physical dimensions, card edge placements, mounting hole locations, and LED indicator placements. Different vendors may implement one or more SSDs conforming to the various SNIA EDSFF standards. The following Table-1 summarizes the physical dimensions of the media drives (e.g., SSDs) conforming to an EDSFF E1.S specification and an EDSFF E3.S specification (all dimensions expressed in units of millimeters).

TABLE 1

|  | EDSFF E3.S 1T | EDSFF E3.S 2T | EDSFF E1.S | | | | |
| --- | --- | --- | --- | --- | --- | --- | --- |
| THICKNESS | 7.50 | 16.80 | 5.90 | 8.01 | 9.50 | 15.00 | 25.00 |
| LENGTH | 112.75 | | 111.49 | | 118.75 | | |
| WIDTH | 76.00 | | | | 33.75 | | |

Referring to Table-1, for example, the media drives that are based on EDSFF E3.S specifications have two different form factors e.g., E3.S 1T thickness and E3.S 2T thickness. Hence, two drive carriers having a 1T thickness and a 2T thickness may have to be configured to receive, carry, and mount such two different E3.S drives (e.g., E3.S 1T drive and E3.S 2T drive) to the electronic device. Further, the media drives that are based on EDSFF E1.S specifications have five different form factors. Hence, five drive carriers may have to be configured to receive, carry, and mount such five different E1.S drives to the electronic device. However, manufacturing various drive carriers for the media drives (e.g., E1.S drives and the E3.S drives) having different form factors may be cumbersome, time consuming, and expensive. For example, different tooling may be needed for each of the different drive carriers. Moreover, each drive carrier may need to have its own separate stock-keeping-unit SKU, which can increase costs and complexity for supply chains. In addition, maintaining such various drive carriers may also result in additional inventory, which may in turn increase costs.

A technical solution to the aforementioned problems includes providing a drive adaptor having a drive compartment defined within a portion of the drive adaptor, where the drive compartment is configured to receive and retain multiple different form factors of media drives, and where the drive adaptor itself is configured to be received in a drive carrier to allow the drive carrier to indirectly carry the media drive retained by the drive adaptor. In other words, the drive carrier that is configured to receive and carry a one type of media drive, can alternatively be used to carry media drives having other form factors via the drive adaptor. Specifically, the drive adaptor receives and carries the alternative form factor media drives, and then the drive adaptor is itself received and carried by the drive carrier. Thus, the drive carrier may either directly carry drives having one form factor or may indirectly carry the alternative drives having another form factor by carrying the drive adaptor which in turn carriers the alternative media drives. For example, the drive that the drive carrier is configured to directly carry has a greater dimension than that of the alternative media drives the drive adaptor is configured to carry. Hence, the drive adaptor may obviate the need for using multiple different drive carriers to receive the different form factors drives, as a single drive carrier (together with the drive adaptor) can accommodate or receive many different form factors. In particular, in some examples the drive adaptor is configured to receive and retain the media drives based on the EDSFF E1.S specification within its drive compartment, and such drive adaptor may be received by the drive carrier that is configured to receive a media drive with the form factor based on the EDSFF E3.S specifications. Therefore, the media drives that are based on EDSFF E1.S specifications may not require separate drive carriers to receive, retain, and mount to the computing system.

In some examples, the drive adaptor includes a front wall, a rear wall, a first side wall, a second side wall, a third side wall, and a fourth side wall. The front wall has first and second ends and the rear wall has third and fourth ends. The first side wall extends between the first and third ends and the second side wall extends between the second and fourth ends to define an adaptor volume. The third and fourth side walls are disposed between the first and second side walls and connected to the front and rear walls to define a drive compartment within a portion of the adaptor volume and one or more buffer compartments within a remaining portion of the adaptor volume. In such examples, each of the third and fourth side walls includes one or more retention elements. The drive compartment is dimensioned to receive and carry drives that are part of a first family or group of form factors, with one or more dimensions of the drive compartment (e.g., a width dimension) conforming to corresponding dimensions of drive. These drives that are part of the first family or group of form factors may be referred to collectively hereinafter as first form factor drives (note that the first family or group of form factors may include just one form factor or multiple different form factors). In such examples, in a state of the first form factor drive being received in the drive compartment, the one or more retention elements retain the first form factor drive in the drive compartment. Further, the drive adaptor may itself be configured to be carried by a drive carrier, with the drive adaptor received in a drive carrier volume defined between front and side walls of the drive carrier. The drive carrier volume is dimensioned to receive a drive having a form factor that is part of a second family or group of form factors, with one or more dimensions of the drive carrier volume (e.g., a width dimension) conforming to corresponding dimensions of drive. These drives that are part of the second family or group of form factors may be referred to collectively hereinafter as second form factor drives (note that the second family or group of form factors may include just one form factor or multiple different form factors). The drive carrier volume is greater than the compartment volume of the adaptor.

It may be noted that references herein to the drive compartment receiving the first form factor drive or the drive carrier volume receiving the second form factor drive do not imply that the entirety of the respective drives are contained within the respective compartments/volumes; instead, in one or more protruding portions of the drives can protrude out of the compartment/volume. For example, in some implementations all of the first form factor drive is received within the drive compartment except for a protruding portion e.g., a connector and/or a protrusion of the first form factor drive which protrudes outside of the drive compartment. More specifically, in some examples, the drive compartment has at least a width dimension corresponding to a width dimension shared by all of the first form factor drives. Moreover, in some examples, the drive compartment has a length dimension corresponding to a length dimension shared by all of the first form factor drives excluding the protruding portion (e.g., the connector and/or the protrusion) thereof. Similarly, in some examples, the drive carrier volume has at least a width dimension corresponding to a width dimension of the second form factor drive and a length dimension corresponding to a length dimension of the second form factor drive excluding a protruding portion (e.g., connector).

In one or more examples, the drive adaptor is a first drive adaptor configured to receive and retain the E1.S 5.90 mm drive or E1.S 8.01 mm drive. In other words, in these examples the first family or group of form factors includes E1.S 5.90 mm and E1.S 8.01 mm form factors. In such examples, a drive carrier that is configured to receive the E3.S 1T drive may be used to receive the first drive adaptor. In other words, in these examples the second family or group of form factors comprises the E3.S 1T form factor. It may be noted herein, the drive carrier that is configured to receive the first drive adaptor may also be referred to as a 1T EDSFF drive carrier.

In one or more other examples, the drive adaptor is a second drive adaptor configured to receive and retain the E1.S 9.50 mm drive, E1.S 15.00 mm drive, or E1.S 25.00 mm drive. In other words, in these examples the first family or group of form factors comprises the E1.S 9.50 mm, E1.S 15.00 mm, and E1.S 25.00 mm form factors. In such examples, a drive carrier that is configured to receive an E3.S 2T drive may be used to receive the second drive adaptor. In other words, in these examples the second family or group of form factors includes the E3.S 2T form factor. The drive carrier that is configured to receive the second drive adaptor may also be referred to as a 2T EDSFF drive carrier. In one or more examples, the second drive adaptor may further include an auxiliary front element disposed on the front wall and coupled to one or more auxiliary mounting elements disposed in the second drive adaptor to increase the adaptor volume (e.g., a thickness or a height) of the second drive adaptor. In some examples, the second drive adaptor having the auxiliary front element may be used to retain the E1.S 25.00 mm drive. In such examples, when the second drive adaptor and the auxiliary front element are disposed in a drive cage of an electronic device, they may occupy three drive bays of the drive cage and further cover or close a front end portion of the drive cage corresponding to the three drive bays to prevent thermal leakage from the drive cage and provide EMI shielding to the electronic device (e.g., E1.S 25.00 mm drive disposed in the drive cage).

Accordingly, when the drive carrier having the first drive adaptor is arranged in a drive cage of the electronic device, the drive carrier may occupy one drive bay in the drive cage. Further, when the drive carrier having the second drive adaptor (without the auxiliary front element) is arranged in the drive cage, the drive carrier may occupy two drive bays in the drive cage. Additionally, when the drive carrier having the second drive adaptor and the auxiliary front element, is disposed in the drive cage, the drive carrier may occupy three drive bays in the drive cage.

In one or more examples, the drive adaptor may include one or more retention elements which may be used to retain the first form factor drives within the drive compartment. Hence, the one or more retention elements may prevent such first form factor drives from getting accidentally dislodged from the drive compartment during installation of the first form drives to the electronic device and during vibration events in the electronic device. In some examples, the one or more retention elements includes one or more threaded fasteners and one or more threaded holes defined by each of the third and fourth side walls. In such examples, in the state of the first form factor drive being received in the drive compartment, the one or more threaded holes are aligned with one or more holes of the first form factor drive to receive the one or more threaded fasteners and detachably connect the first form factor drive to the drive adaptor. In some other examples, the one or more retention elements comprise one or more flexible snap-fit elements disposed in the drive adaptor and facing the drive compartment. In such examples, in the state of the first form factor drive being received in the drive compartment, the one or more flexible snap-fit elements engage with one or more peripheral edge portions of the first form factor drive and detachably connect the first form factor drive to the drive adaptor. In some examples, the front wall of the drive adaptor further includes a retainer cutout that allows a protrusion of the first form factor drive to protrude beyond the front wall and provide support to the first form factor drive.

Because the drive adaptors described herein allow for drives of multiple different types of form factors to be used with the same drive carrier, it is no longer necessary to design and produce different drive carriers for each such form factor. This greatly reduces the costs of the drive carriers, as the time for designing the carriers may be reduced, the amount of tooling needed is reduced, and proliferation of stock-keeping-units SKU can be avoided. For example, because the E1.S drives having a variety of form factors may be received and retained in the same drive carrier that is configured for the E3.S drives, through the drive adaptor, there is no additional requirement to design different drive carriers for the E1.S drives. Accordingly, the cost, time, and labor associated with manufacturing several drive carriers specific for each of the E1.S drives may be reduced. In addition, maintaining inventory of such various drive carriers for each of the E1.S drives may be prevented. Further, having different tooling for manufacturing different drive carriers for each of the E1.S drives may be avoided. Accordingly, there is no need to have a separate stock-keeping-unit SKU for drive carriers for each of the E1.S drives, which can decrease costs and complexity for supply chains. Further, since the drive carriers for E3.S drives have a standard thickness (e.g., a 1T thickness or a 2T thickness), a storage density in a drive cage of the electronic device may be optimized to receive and carry the E1.S drives having different non-standard form factors (e.g., thickness). Additionally, since the drive adaptor has one or more retention elements to retain the E1.S drives within the drive compartment of the drive adaptor, the E1.S drives are protected against getting dislodged from the drive compartment.

Referring to the Figures, FIG. 1A depicts a front isometric view of a first E1.S drive 100 having a form factor according to an E1.S 5.90 mm EDSFF specification. The first E1.S drive 100 is one example of the first form factor drives mentioned above which may be carried by a drive adaptor. The first E1.S drive 100 has a volume 102 defined by a length, a width, and a thickness, as indicated by an orientation legend 10, and corresponding to values set forth in Table 1. Although in various examples of the first E1.S drive 100, a circuitry and other components of the first E1.S drive 100 may not occupy the entirety of the first volume 102. The first E1.S drive 100 may have a first indicator light-emitting diode (LED) 104 on a front face 106 thereof for indicating power and activity of the first E1.S drive 100. The first E1.S drive 100 may have a second indicator LED (not visible in FIG. 1A) on front face 106 for indicating attention or error conditions for the first E1.S drive 100. The first E1.S drive 100 further includes one or more holes 110. In some examples, the one or more holes 110 are formed proximate to corners of the first E1.S drive 100. Also visible in FIG. 1A is a rear card edge connector 108 for connection of the first E1.S drive 100 to circuitry such as with a backplane connection (not shown) of an electronic device e.g., a datacenter computing device. The location, pin count, and pin definitions of card edge connectors such as the rear card edge connector 108 are specified as part of the E1.S specification.

FIG. 1B depicts a front isometric view of a second E1.S drive 120 having a form factor according to an E1.S 8.01 mm EDSFF specification. The second E1.S drive 120 is one example of the first form factor drives mentioned above which may be carried by a drive adaptor. The second E1.S drive 120 has a first volume 122 defined by a length, a width, and a thickness, as indicated by the orientation legend 10, and corresponding to values set forth in Table 1. While a reference numeral 132 designates an overall heat sink volume specified for a heat sink element 134 associated with second E1.S drive 120. Although in various examples of the second E1.S drive 120, a circuitry and other components of the second E1.S drive 120 may not occupy the entirety of the first volume 122, and the heat sink element 134 of the second E1.S drive 120 may not occupy the entirety of heat sink volume 132. The second E1.S drive 120 may have a first indicator light-emitting diode (LED) 124 on a front face 126 thereof for indicating power and activity of the second E1.S drive 120. The second E1.S drive 120 may have a second indicator LED (not visible in FIG. 1B) on the front face 126 for indicating attention or error conditions for second E1.S drive 120. The second E1.S drive 120 further includes one or more holes 130. In some examples, the one or more holes 130 are formed proximate to corners of the second E1.S drive 120. Also visible in FIG. 1B is a rear card edge connector 128 for connection of second E1.S drive 120 to circuitry such as with a backplane connection (not shown) of an electronic device. The location, pin count, and pin definitions of rear card edge connectors such as rear card edge connector 128 are specified as part of the E1.S specification. Referring to Table-1, a total length of the first E1.S drive 100 or the second E1.S drive 120 of about 111.49 mm is inclusive of a respective protruding portion such as the connector 108 or 128. However, the length of the first E1.S drive 100 or the second E1.S drive 120 excluding such respective protruding portion may be about 106.75 mm.

FIG. 1C depicts a front isometric view of a third E1.S drive 140 having a form factor according to an E1.S 9.50 mm EDSFF specification. The third E1.S drive 140 is one example of the first form factor drives mentioned above which may be carried by a drive adaptor. The third E1.S drive 140 has a first volume 142 defined by a length, a width, and a thickness, as indicated by an orientation legend 10, and corresponding to values set forth in Table 1. Although in various examples of the third E1.S drive 140, a circuitry and other components of the third E1.S drive 140 may not occupy the entirety of the first volume 142. Further, indicator lights on a front face of the third E1.S drive 140 are not visible in the front face 146 of the third E1.S drive 140. The third E1.S drive 140 further includes a protrusion 158 formed at the front face 146 of the third E1.S drive 140. In some examples, the protrusion 158 has one or more holes 150. FIG. 1C does show a rear card edge connector 148 for connection of third E1.S drive 140 to circuitry such as with a backplane connection (not shown) of an electronic device. The location, pin count, and pin definitions of rear card edge connectors such as rear card edge connector 148 are specified as part of the E1.S specification.

FIG. 1D depicts a front isometric view of a fourth E1.S drive 160 having a form factor according to an E1.S 15.00 mm EDSFF specification. The fourth E1.S drive 160 is one example of the first form factor drives mentioned above which may be carried by a drive adaptor. The fourth E1.S drive 160 has a first volume 162 defined by a length, a width, and a thickness, as indicated by an orientation legend 10, and corresponding to values set forth in Table 1. While a reference numeral 172 designates an overall heat sink volume specified for a heat sink element 174 associated with fourth E1.S drive 160. Although in various examples of the fourth E1.S drive 160, the circuitry and other components of the fourth E1.S drive 160 may not occupy the entirety of the first volume 162, and the heat sink element 174 of the fourth E1.S drive 160 may not occupy the entirety of the heat sink volume 172. Further, indicator lights on a front face 166 of the fourth E1.S drive 160 are not visible in the view of FIG. 1D. The fourth E1.S drive 160 further includes a protrusion 178 formed at the front face 166 of the fourth E1.S drive 160. In some examples, the protrusion 178 has one or more holes 170. FIG. 1D does show a rear card edge connector 168 for connection of the fourth E1.S drive 160 to circuitry such as with a backplane connection (not shown) of an electronic device. The location, pin count, and pin definitions of card edge connectors such as the rear card edge connector 168 are specified as part of the E1.S specification.

FIG. 1E depicts a front isometric view illustrating a fifth E1.S drive 180 having a form factor according to an E1.S 25.00 mm EDSFF specification. The fifth E1.S drive 180 is one example of the first form factor drives mentioned above which may be carried by a drive adaptor. The fifth E1.S drive 180 has a first volume 182 defined by a length, a width, and a thickness, as indicated by an orientation legend 10, and corresponding to values set forth in Table 1. While a reference numeral 192 designates an overall heat sink volume specified for a heat sink element 194 associated with fifth E1.S drive 180. Although in various examples of the fifth E1.S drive 180, the circuitry and other components of the fifth E1.S drive 180 may not occupy the entirety of the first volume 182, and the heat sink element 194 of the fifth E1.S drive 180 may not occupy the entirety of the heat sink volume 192. Further, indicator lights on a front face 186 of the fifth E1.S drive 180 are not visible in the view of FIG. 1E. The fifth E1.S drive 180 further includes a protrusion 198 formed at the front face 186 of the fifth E1.S drive 180. In some examples, the protrusion 198 has one or more holes 190. FIG. 1E does show a rear card edge connector 188 for connection of the fifth E1.S drive 180 to circuitry such as with a backplane connection (not shown) of an electronic device. The location, pin count, and pin definitions of card edge connectors such as the rear card edge connector 188 are specified as part of the E1.S specification. Referring to Table-1, a total length of the third E1.S drive 140 or the fourth E1.S drive 160 or the fifth E1.S drive 180 of about 118.75 mm is inclusive of respective protruding portions such as the connector 148 or 168 or 188 and the protrusions 158 or 178 or 198. However, the length of the third E1.S drive 140 or the fourth E1.S drive 160 or the fifth E1.S drive 180 excluding such respective protruding portions may be about 106.75 mm.

Figure 2A:
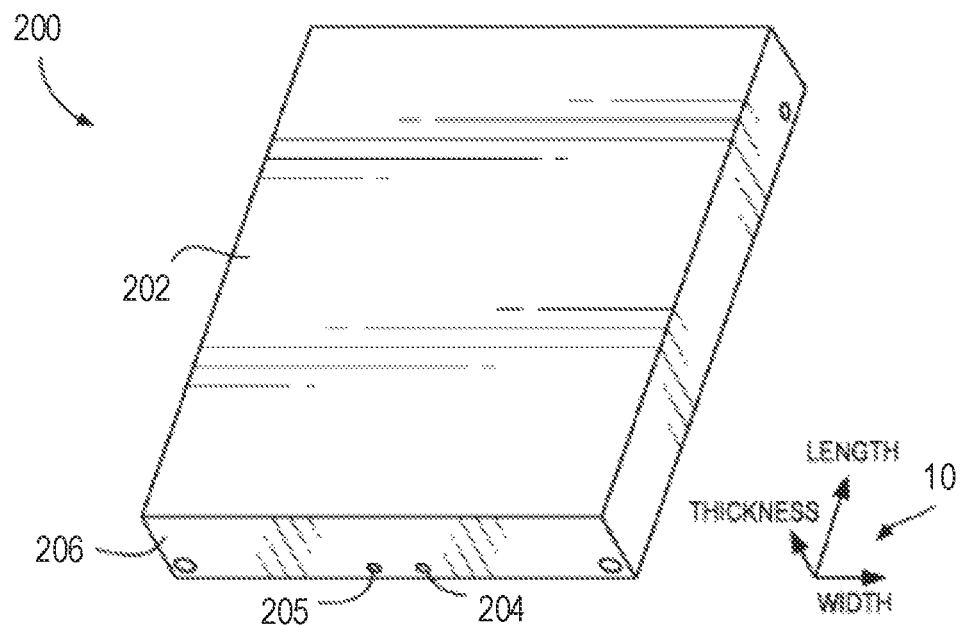
FIG. 2A illustrates a front isometric view of a first E3.S drive according to an E3.S 2T EDSFF specification.

Referring to the Figures, FIG. 2A depicts a front isometric view of a first E3.S drive 200 having a form factor according to an E3.S 2T EDSFF specification. The first E3.S drive is one example of the second form factor drives mentioned above which may be carried directly by a drive carrier without the drive adaptor. The first E3.S drive 200 has a second volume 202 defined by a length, a width, and a thickness, as indicated by orientation legend 10, and corresponding to the values set forth in Table 1. Although in various examples of the first E3.S drive 200, and other components of the first E3.S drive 200 may not occupy the entirety of the second volume 202. The first E3.S drive 200 may have a first indicator light-emitting diode (LED) 204 on a front face 206 thereof for indicating power and activity of first E3.S drive 200. Further, the first E3.S drive 200 may have a second indicator LED 205 on the front face 206 for indicating attention or error conditions for the first E3.S drive 200. In this example, the second indicator LEDs 204 and 205 are arranged side-by-side in the thickness dimension of the first E3.S drive 200, and may be spaced about 4 millimeters apart. While not visible in FIG. 2A, a rear card edge connector is located on the rear side of the first E3.S drive 200 for connection to circuitry such as with a midplane or backplane circuit board of an electronic device. The location, pin count, and pin definitions of card edge connectors such as the rear card edge connector are specified as part of the E3.S specification.

Figure 2B:
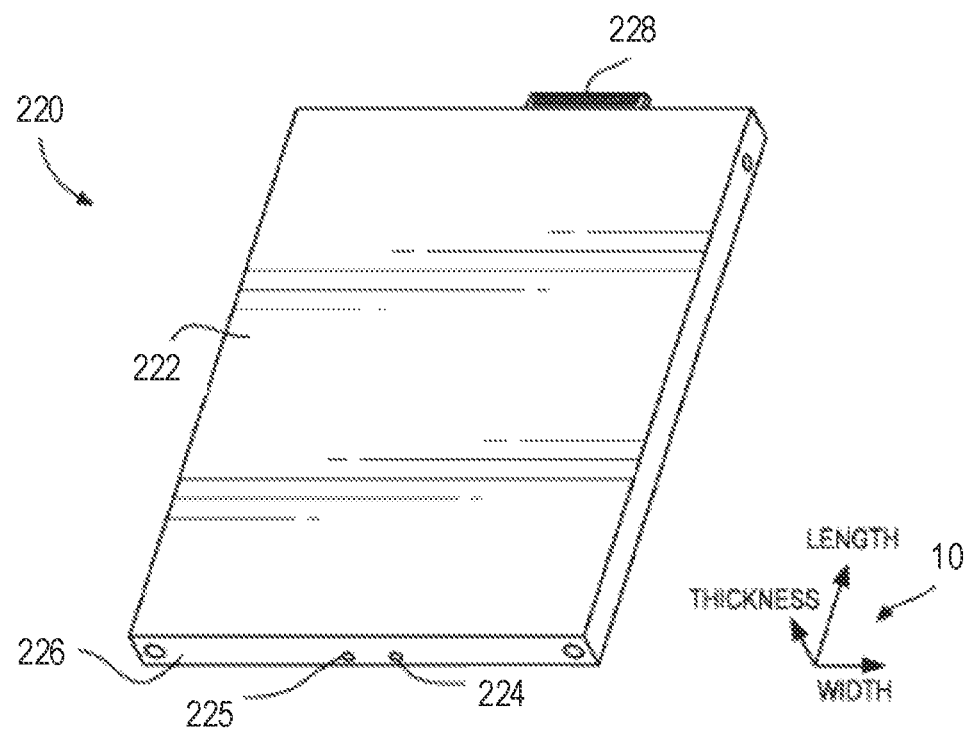
FIG. 2B illustrates a front isometric view of a second E3.S drive according to an E3.S 1T EDSFF specification.

FIG. 2B depicts a front isometric view of another a second E3.S drive 220 having a form factor according to an E3.S 1T EDSFF specification. The second E3.S drive is one example of the second form factor drives mentioned above which may be carried directly by a drive carrier without the drive adaptor. The second E3.S drive 220 has a second volume 222 defined by a length, a width, and a thickness, as indicated by an orientation legend 10, and corresponding to values set forth in Table 1. Although in various examples of the second E3.S drive 220, and other components of the second E3.S drive 220 may not occupy the entirety of the second volume 222. The second E3.S drive 220 may have a first indicator light-emitting diode (LED) 224 on a front face 226 thereof for indicating power and activity of second E3.S drive 220. Further, the second E3.S drive 220 may have a second indicator LED 225 on the front face 226 for indicating attention or error conditions for the second E3.S drive 220. In this example, the second indicator LEDs 224 and 225 are arranged side-by-side in the thickness dimension of second E3.S drive 220, and may be spaced about 4 millimeters apart. Also visible in FIG. 2B is a rear card edge connector 228 for connection of the second E3.S drive 220 to circuitry such as with a backplane connection an electronic device. The location, pin count, and pin definitions of card edge connectors such as the rear card edge connector 228 are specified as part of the E3.S specification. Referring to Table-1, a total length of the first E3.S drive 200 or the second E3.S drive 220 of about 112.75 mm is inclusive of respective protruding portions such as the connector 208 or 228. However, the length of the first E3. S drive 200 or the second E3.S drive 220 excluding such respective protruding portions may be about 106.75 mm.

FIG. 3A depicts a perspective front view of a drive adaptor 300 and FIG. 3B depicts a perspective rear view of the drive adaptor 300. In the description hereinafter, FIGS. 3A-3B are described concurrently for ease of illustration. It should be understood, however, that FIGS. 3A-3B are not intended to illustrate specific shapes, dimensions, or other structural details accurately or to scale, and that implementations of the drive adaptor 300 may have different numbers and arrangements of the illustrated components and may also include other parts that are not illustrated.

In one or more examples, the drive adaptor 300 may be configured to receive and retain any one of a plurality of first form factor drives. Specifically, in some examples the drive adaptor 300 is configured to receive and retain the first or second E1. S drive 100 or 120 (as shown in FIGS. 1A, 1B). Moreover, the drive adaptor 300 is configured to be mounted to a drive carrier that is configured to receive a second form factor drive. Specially, in some examples, the drive adaptor 300 is configured to be received in the drive carrier 500 (described below) configured to receive the second E3.S drive 220 described above. Thus, the drive carrier 500 together with the drive adaptor 300 can be used to install the first or second E1.S drive 100 or 120 into an electronic device. The drive adaptor 300 includes a front wall 302, a rear wall 304, a first side wall 306, a second side wall 308, a third side wall 310, a fourth side wall 312, one or more threaded holes 316, one or more adaptor mounting holes 318, one or more screw inserts 320, and a pair of light holes 322.

The front wall 302 has a first end 324 and a second end 326. Similarly, the rear wall 304 has a third end 328 and a fourth end 330. The front and rear walls 302, 304 are disposed spaced apart and parallel to each other. The first and second side walls 306, 308 are disposed spaced apart and parallel to each other. In such examples, each of front wall 302 and the rear wall 304 has a thickness as indicated by the orientation legend 10. Further, the first side wall 306 extends between the first and third ends 324, 328 and the second side wall 308 extends between the second and fourth ends 326, 330 to define an adaptor volume 332 of the drive adaptor 300. Similarly, the third and fourth side walls 310, 312 are disposed spaced apart and parallel to each other. Further, the third and fourth side walls 310, 312 are disposed between the first and second side walls 306, 308 and connected to the front and rear walls 302, 304 to define a drive compartment 334 within a portion of the adaptor volume 332 and one or more buffer compartments 336 within a remaining portion of the adaptor volume 332. In one or more examples, the drive compartment 334 has a compartment volume 344 that is defined by a first thickness of about 7.50 mm, a first width of 33.75 mm, and a first length of about 106.75 mm. Similarly, the adaptor volume 332 is defined by a second thickness of about 7.50 mm, and a second width of 76.00 mm, and a second length of about 106.75 mm. It may be noted herein that the second width is greater than the first width. In one or more examples, the drive compartment 334 and the one or more buffer compartments 336 are arranged in the adaptor volume 332 such that, in the state of the first or second E1.S drive 100 or 120 being received in the drive compartment 334, the connector 108 or 128 of the first or second E1.S drive 100 or 120 is aligned with another connector (not shown) of an electronic component (e.g., backplane circuit board) of the electronic device. In other words, when the drive adaptor 300 is installed in a drive carrier 500 (as shown in FIG. 5), the connector 108 or 128 of the first or second E1.S drive 100 or 120 disposed in the drive adaptor 300 is in the same location as a connector of the second E3.S drive 220, when the second E3.S drive 220 is disposed in the drive carrier 500. Thus, a same drive cage and a same backplane (or midplane) circuit board may be used for both the first or second E1.S drive 100 or 120 and the second E3.S drive 220.

In some examples, the front wall 302 includes the one or more adaptor mounting holes 318 to allow the drive adaptor 300 to be coupled to a front structure of the drive carrier 500. In the example of FIGS. 3A-3B, the front wall 302 includes one adaptor mounting hole 318 disposed at each of the first and second ends 324, 326 of the front wall 302 and the adaptor mounting hole 318 may be aligned to a corresponding buffer compartment 336. The rear wall 304 includes an opening 338 to provide access to a rear end 340 of the drive compartment 334. In particular, in the state of the first or second E1.S drive 100 or 120 being received in the drive compartment 334, the opening 338 may allow a connector 108 or 128 of the first or second E1.S drive 100 or 120 to protrude beyond the rear wall 304. Further, each of the first and second side walls 306, 308 includes the one or more screw inserts 320 to allow the drive adaptor 300 to be coupled to a rear end of the drive carrier 500. In the example of FIGS. 3A-3B, each of the first and second side walls 306, 308 includes one screw insert 320 disposed proximate to the rear wall 304. Similarly, each of the third and fourth side walls 310, 312 includes the one or more threaded holes 316 to allow the first or second E1.S drive 100 or 120 to be coupled to the drive adaptor 300. In the example of FIGS. 3A-3B, each of the third and fourth side walls 310, 312 includes two threaded holes 316, each disposed at a front and a rear end of the third and fourth side walls 310, 312 respectively. Further, the pair of light holes 322 are disposed in the front wall 302 and aligned to the drive compartment 334. In some examples, each of the first and second side walls 306, 308 has a thickness that conforms to a 1T thickness of the drive carrier 500.

Figure 4:
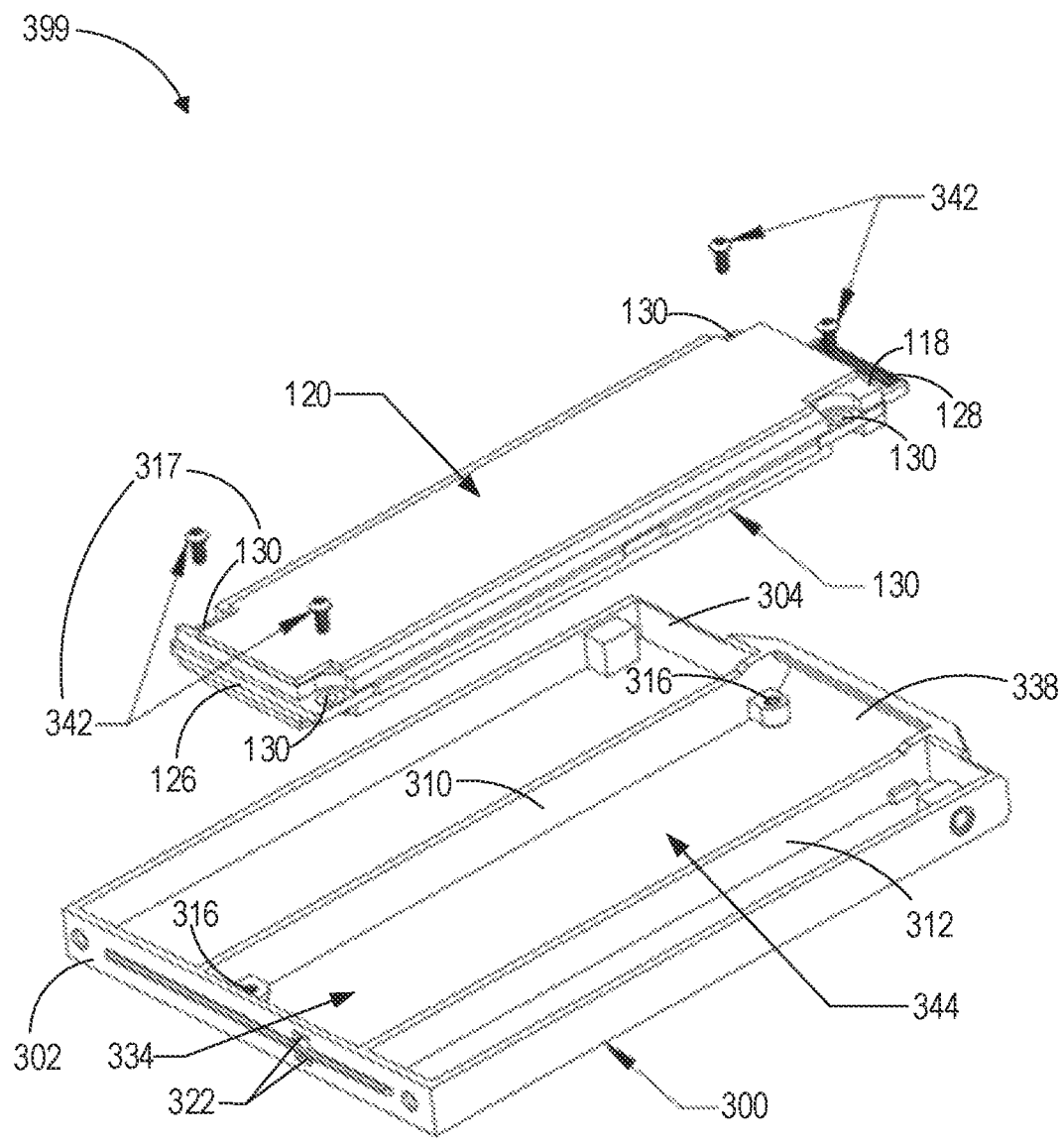
FIG. 4 illustrates an exploded perspective view of a drive adaptor assembly having the second E1.S drive of FIG. 1B and the drive adaptor of FIGS. 3A-3B according to an example of the present disclosure.

FIG. 4 depicts an exploded perspective view of a second E1.S drive 120 and a drive adaptor 300. As discussed herein, the second E1.S drive 120 includes one or more holes 130. For example, the one or more holes 130 are disposed proximate to corners of the second E1.S drive 120. The second E1.S drive 120 further has a first volume 122 defined by a length, a width, and a thickness, as indicated by the orientation legend 10 (as shown in FIG. 1B), and corresponding to values set forth in Table 1. It may be noted herein that the first volume 122 is defined by excluding the protruding portion e.g., the length of the connector 128 of the second E1.S drive 120.

The drive adaptor 300 includes one or more threaded holes 316. For example, the one or more threaded holes 316 are disposed at the front and the rear end of the third and fourth side walls 310, 312. In some examples, the drive adaptor 300 has the drive compartment 334 having a compartment volume 344. In one or more examples, the compartment volume 344 is defined by the first thickness of about 7.50 mm, the first width of about 33.75 mm, and the first length of about 106.75 mm. Thus, the compartment volume 344 of the drive compartment 334 may allow the first or second E1.S drives 100 or 120 to be received in the drive compartment 334. More specifically, the width of the compartment volume 344 is approximately equal to the width of each of the first and second E1.S drives 100 and 120 so that the third and fourth side walls 310 and 312 are adjacent to the first and second E1.S drives 100 and 120 when received in the compartment volume 344, and also the length of the compartment volume 344 is approximately equal to the length of each of the first and second E1.S drives 100 and 120 excluding the protruding portions such as the connectors 108 and 128. Even though the second E1.S drive 120 having 8.01 mm thickness falls outside of the first thickness of about 7.50 mm of the compartment volume 344, the 8.01 mm thickness of the second E1.S drive 120 may be indirectly accommodated by the thickness (1T) of a drive carrier 500 (as shown in FIG. 5). The drive adaptor 300 further includes one or more threaded fasteners 342. In one or more examples, when the second E1.S drive 120 is disposed in the drive compartment 334, the one or more threaded holes 316 are aligned to the one or more holes 130 to receive the one or more threaded fasteners 342. It may be noted herein that the one or more threaded fasteners 342 and one or more threaded holes 316 defined by each of the third and fourth side walls 310, 312 may be collectively referred to as one or more retention elements 317. Further, the front face 126 of the second E1.S drive 120 abuts the rear face of the front wall 302 of the drive adaptor 300 and the connector 128 of the second E1.S drive 120 protrudes beyond the rear wall 304 via the opening 338. Similarly, the first indicator LED 124 (as labeled in FIG. 1B) and the second LED of the second E1.S drive 120 are aligned to the pair of light holes 322 in the drive adaptor 300 to allow lights emitted from the second E1.S drive 120 to travel beyond the drive adaptor 300. In one or more examples, the one or more threaded fasteners 342 may extend through the one or more holes 130 and the one or more threaded holes 316 and detachably connect the second E1.S drive 120 to the drive adaptor 300 to form a drive adaptor assembly 399. In other words, the one or more retention elements 317 detachably connects the second E1.S drive 120 to the drive adaptor 300. Although the mounting of the drive to the drive adaptor 300 is described and illustrated in relation to the second E1.S drive 120, it should be understood that the same principles apply to the mounting of the first E1.S drive 100 to the drive adaptor 300.

FIG. 5 depicts a perspective rear view of a drive carrier 500. It should be understood, however, that FIG. 5 is not intended to illustrate specific shapes, dimensions, or other structural details accurately or to scale, and that implementations of the drive carrier 500 may have different numbers and arrangements of the illustrated components and may also include other parts that are not illustrated. In one or more examples, the drive carrier 500 may be used to receive and carry the second E3.S drive 220 and releasably couple the second E3.S drive 220 to an electronic device. The drive carrier 500 includes a front structure 502, a first side structure 504, a second side structure 506, one or more adaptor mounting posts 508, one or more screw holes 510, and a pair of light pipes 512.

In one or more examples, the front structure 502 has a first end 514, a second end 516, a front face 518, and a rear face 520 opposite to the front face 518. In such examples, the first side structure 504 extends perpendicularly from the first end 514 and the second side structure 506 extends perpendicularly from the second end 516, forming a substantially U-shaped structure with squared corners. In some examples, the drive carrier 500 has a drive carrier volume 522 defined between the front structure 502 and the first and second side structures 504, 506. In such examples, the drive carrier volume 522 may conform to a second volume 222 (as shown in FIG. 2B) of a second E3.S drive 220. Further, the drive carrier volume 522 may also conform to the adaptor volume 332 of the drive adaptor 300 (as shown in FIG. 3A). More specifically, the width of the drive carrier volume 522 is approximately equal to the width of each of the second E3.S drive 220 and drive adaptor 300 so that the side structures 504 and 506 are adjacent to the second E2.S drive 220 or the drive adaptor 300 when received in the drive carrier volume 522, and also the length of the drive carrier volume 522 is approximately equal to the length of each of the second E3.S drive 220 (excluding the protruding portion such as the connector 228) and the length of the drive adaptor 300. In addition, a thickness of the drive carrier volume 522 is equal to or exceeds the thicknesses of each of the second E3.S drive 220 and the drive adaptor 300.

In some examples, each of the first side structure 504 and the second side structure 506 has a screw hole 510 for attachment of the drive carrier 500 to the drive adaptor 300, as described herein. The front structure 502 includes the one or more adaptor mounting posts 508 to allow the drive carrier 500 to be coupled to a front end of the drive adaptor 300. In the example of FIG. 5, one adaptor mounting post 508 is disposed at the first and second ends 514, 516 of the front structure 502. The adaptor mounting posts 508 extend from the rear face 520 of the front structure 502 and are aligned to the one or more buffer compartments 336 of the drive adaptor 300. Similarly, the front structure 502 further includes the pair of light pipes 512 disposed spaced apart from each other along the thickness of the drive carrier 500. In the example of FIG. 5, each of the pair of light pipes 512 extend from the rear face 520 of the front structure 502 and are aligned to the pair of light holes 322 in the drive adaptor 300. In some examples, the drive carrier 500 is an EDSFF drive carrier having the drive carrier volume 522 that conform to that of the second E3.S drive 220 and the drive adaptor 300. In particular, the drive carrier 300 has a 1T thickness to receive and carry the second E3.S drive 220 or the drive adaptor 300 having the second E1.S drive 120, within the drive carrier volume 522.

FIG. 6A depicts an assembled perspective rear view of a drive carrier 500 and a drive adaptor assembly 399. FIG. 6B depicts an assembled perspective front view of the drive carrier 500 and the drive adaptor assembly 399 of FIG. 6A. In the description hereinafter, FIGS. 6A-6B are described concurrently for ease of illustration. It should be understood, however, that FIGS. 6A-6B are not intended to illustrate specific shapes, dimensions, or other structural details accurately or to scale, and that implementations of a drive carrier assembly 699 may have different numbers and arrangements of the illustrated components and may also include other parts that are not illustrated.

Since the compartment volume 344 (as labeled in FIGS. 3A-3B) conforms to that of the first volume 122 (as labeled in FIG. 1B) of the second E1.S drive 120, the second E1.S drive 120 may be received in the drive compartment 334 of the drive adaptor 300. In such examples, in the state of the second E1.S drive 120 being received in the drive compartment 334, the one or more threaded holes 316 are aligned to the one or more holes 130 to receive the one or more threaded fasteners 342 (as shown in FIG. 4) to retain the front face 126 and the rear face 118 of the second E1.S drive 120 to the drive compartment 334. Thus, the one or more retention elements 317 detachably connect the second E1.S drive 120 to the drive adaptor 700 to form a drive adaptor assembly 399.

Similarly, since the drive carrier volume 522 (as labeled in FIG. 5) conforms to that of the adaptor volume 332 (as labeled in FIGS. 3A-3B), the drive adaptor 300 may be received in the drive carrier 500. In such examples, when the drive adaptor 300 is disposed in the drive carrier volume 522, the front structure 502, the first side structure 504, and the second side structure 506 in conjunction receives the drive adaptor 300 such that the rear face 520 of the front structure 502 abuts the front wall 302 of the drive adaptor 300, first side structure 504 abuts the first side wall 306 of the drive adaptor 300, and the second side structure 506 abuts the second side wall 308 of the drive adaptor 300. In such examples, the connector 128 of the second E1.S drive 120 protrudes beyond the rear wall 304 via the opening 338. Further, the pair of light pipes 512 (as shown in FIG. 5) in the drive carrier 500 extends into the pair of light holes 322 (as shown in FIGS. 3A-3B) in the drive adaptor 300 so as to allow the light to travel beyond the drive carrier 500. Additionally, the one or more adaptor mounting posts 508 extends through the one or more adaptor mounting holes 318 to connect the front end of the drive adaptor 300 to the drive carrier 500. Further, the screw hole 510 of the drive carrier 500 is aligned with a corresponding screw insert 320 of the drive adaptor 300 to receive a screw fastener among the pair of screw fasteners 630 and detachably connect the drive adaptor 300 to the drive carrier 500 and form a drive carrier assembly 699.

Since each of the first and second E1.S drives 100, 120 may be received and retained in the drive carrier 500 that is configured for the second E3.S drive 220, through the drive adaptor 300, there is no additional requirement to design separate drive carriers for the first and second E1.S drives 100, 120. Accordingly, the cost, time, and labor associated with manufacturing several drive carriers specific for each of the first and second E1.S drives 100, 120 may be reduced. In addition, maintaining inventory of such various drive carriers for each of the first and second E1.S drives 100, 120 may be prevented. Further, since the drive carrier 500 for second E3.S drive 220 has a standard thickness (e.g., a 1T thickness), a storage density in a drive cage of the electronic device may be optimized to receive and carry the first and second E1.S drives 100, 120 having different non-standard form factors (e.g., thickness). Additionally, since the drive adaptor 300 has one or more retention elements (e.g., threaded fasteners and threaded holes) to retain the first and second E1.S drives 100, 120 within the drive compartment 334 of the drive adaptor 300, the first and second E1.S drives 100, 120 are protected against getting dislodged from the drive compartment 334.

FIG. 7A depicts a perspective front view of a drive adaptor 700 and FIG. 7B depicts a perspective rear view of the drive adaptor 700. In the description hereinafter, FIGS. 7A-7B are described concurrently for ease of illustration. It should be understood, however, that FIGS. 7A-7B are not intended to illustrate specific shapes, dimensions, or other structural details accurately or to scale, and that implementations of the drive adaptor 700 may have different numbers and arrangements of the illustrated components and may also include other parts that are not illustrated.

In one or more examples, the drive adaptor 700 may be configured to receive and retain any one of the third, fourth, or fifth E1.S drives 140, 160, 180 (as shown in FIGS. 1C, 1D, 1E, respectively) and install the third, fourth, or fifth E1.S drive 140, 160, 180 into an electronic device. The drive adaptor 700 includes a front wall 702, a rear wall 704, a first side wall 706, a second side wall 708, a third side wall 710, a fourth side wall 712, one or more auxiliary mounting elements 714, one or more flexible snap-fit elements 716, and one or more screw inserts 720.

The front wall 702 has a first end 724 and a second end 726. Similarly, the rear wall 704 has a third end 728 and a fourth end 730. The front and rear walls 702, 704 are disposed spaced apart and parallel to each other. The first and second side walls 706, 708 are disposed spaced apart and parallel to each other. In some examples, each of the first and second side walls 706, 708 has a first side portion 707 and a second side portion 709 connected to the first side portion 707. In such examples, the first side portion 707 has a thickness (as indicated by the orientation legend 10) smaller than the thickness of the second side portion 709. In some examples, the thickness of the first side portion 707 may be about 7.5 mm and the thickness of the second side portion 709 may be about 14.61 mm. Further, the first side wall 706 extends between the first and third ends 724, 728 and the second side wall 708 extends between the second and fourth ends 726, 730 to define an adaptor volume 732 of the drive adaptor 700. Similarly, the third and fourth side walls 710, 712 are disposed spaced apart and parallel to each other. Further, the third and fourth side walls 710, 712 are disposed between the first and second side walls 706, 708 and connected to the front and rear walls 702, 704 to define a drive compartment 734 within a portion of the adaptor volume 732 and one or more buffer compartments 736 within a remaining portion of the adaptor volume 732. In one or more examples, the drive compartment 734 has a compartment volume 744 that is defined by a first thickness of 14.61 mm, a first width of about 33.75 mm, and a first length of about 106.75 mm. Similarly, the adaptor volume 732 is defined by a second thickness of about 14.61 mm, and a second width of about 76.00 mm, and a second length of about 106.75 mm. It may be noted herein that the second width is greater than the first width. In one or more examples, the drive compartment 734 and the one or more buffer compartments 736 are arranged in the adaptor volume 732 such that, in the state of the third, fourth, or fifth E1.S drive 140 or 160 or 180 being received in the drive compartment 734, the connector 148 or 168 or 188 of the third, fourth, or fifth E1.S drive 140 or 160 or 180 is aligned with another connector (not shown) of an electronic component (e.g., backplane circuit board) of the electronic device. In other words, when the drive adaptor 700 is installed in a drive carrier 900 (as shown in FIG. 9), the connector 148 or 168 or 188 of the third, fourth, or fifth E1.S drive 140 or 160 or 180 disposed in the drive adaptor 600 is in the same location as a connector of the first E3.S drive 200, when the first E3.S drive 200 is disposed in the drive carrier 900. Thus, a same drive cage and a same backplane (or midplane) circuit board may be used for both the third, fourth, or fifth E1.S drive 140 or 160 or 180 and the first E3.S drive 200.

In some examples, the front wall 702 includes the one or more adaptor mounting holes 718 to allow the drive adaptor 700 to be coupled to a front structure of a drive carrier 900 (as shown in FIG. 9). In the example of FIGS. 7A-7B, the front wall 702 includes one adaptor mounting hole 718 disposed at each of the first and second ends 724, 726 of the front wall 702 and the adaptor mounting hole 718 may be aligned to the buffer compartment 736. The front wall 702 further includes a retainer cutout 738 to provide access to a front end 750 of the drive compartment 734. In the state of the third, fourth, or fifth E1.S drive 140 or 160 or 180 being received in the drive compartment 734, the retainer cutout 738 may allow a protrusion 158 or 178 or 198 of the third, fourth, or fifth E1.S drive 140 or 160 or 180 to protrude beyond the front wall 702 and provide support to the protrusion 158 or 178 or 198 of the third, fourth, or fifth E1.S drive 140 or 160 or 180. The rear wall 704 includes a step-down wall 752 to provide access to a rear end 740 of the drive compartment 734 and in the state of the third, fourth, or fifth E1.S drive 140 or 160 or 180 being received in the drive compartment 734, the step-down wall 752 may allow a connector 148 or 168 or 188 of the third, fourth, or fifth E1.S drive 140 or 160 or 180 to protrude beyond the rear wall 704 and provide support to the connector 148 or 168 or 188. Further, each of the first and second side walls 706, 708 includes the one or more screw inserts 720 to allow the drive adaptor 700 to be coupled to a rear end of the drive carrier 900. In the example of FIGS. 7A-7B, each of the first and second side walls 706, 708 includes one screw insert 720 disposed proximate to the rear wall 704. Similarly, each of the third and fourth side walls 710, 712 includes the one or more retention elements (e.g., one or more flexible snap-fit elements 716) to allow the third, fourth, or fifth E1.S drive 140 or 160 or 180 to be coupled to the drive adaptor 700. In the example of FIGS. 7A-7B, the one or more flexible snap-fit elements 716 is disposed in the one or more buffer compartments 736 and faces the drive compartment 734. The one or more auxiliary mounting elements 714 is disposed in the one or more buffer compartments 736 and contacts the front wall 702 of the drive adaptor 700. In some examples, each of the one or more auxiliary mounting elements 714 includes a mounting recess 746 to receive an auxiliary front element 1100 (as shown in FIGS. 11A-11B) and a hole 748 defined in the mounting recess 746.

FIG. 8A depicts an exploded perspective view of a third E1.S drive 140 and a drive adaptor 700. FIG. 8B depicts an assembled perspective view of the third E1.S drive 140 and the drive adaptor 700. In the description hereinafter, FIGS. 8A-8B are described concurrently for ease of illustration. As discussed herein, the third E1.S drive 140 has a first volume 142 defined by a length, a width, and a thickness, as indicated by the orientation legend 10 (as shown in FIG. 1B), and corresponding to values set forth in Table 1. It may be noted herein that the first volume 140 is defined by excluding the length of the connector 148 of the third E1.S drive 140 and a protrusion 158 of the third E1.S drive 140.

As discussed herein, the drive adaptor 700 has the drive compartment 734 (as labeled in FIGS. 7A-7B) having a compartment volume 744. In one or more examples, the compartment volume 744 is defined by the first thickness of about 14.61 mm, the first width of about 33.75 mm, and the first length of about 106.75 mm. Thus, the compartment volume 744 of the drive compartment 734 may conform to the first volume 142 of the third E1.S drive 140 to receive or accommodate the third E1.S drive 140 in the drive compartment 734. More specifically, the width of the compartment volume 744 is approximately equal to the width of each of the third, fourth, and fifth E1.S drives 140 or 160 or 180 so that the third and fourth side walls 710 and 712 are adjacent to the third, fourth, and fifth E1.S drives 140 or 160 or 180 when received in the compartment volume 744, and also the length of the compartment volume 744 is approximately equal to the length of each of the third, fourth, and fifth E1.S drives 140 or 160 or 180 excluding the protruding portions such as the protrusions 158, 178, and 198 and the connectors 148, 168, and 188. In one or more examples, when a front face 146 of the third E1.S drive 140 is disposed in the drive compartment 734, the protrusion 158 located at the front face 146 of the third E1.S drive 140 extends beyond the front wall 702 of the drive adaptor 700 via the retainer cutout 738. In such examples, the retainer cutout 738 further provides support to the protrusion 158 of the third E1.S drive 140. Further, when a rear face 760 of the third E1.S drive 140 is disposed in the drive compartment 734, the third E1.S drive 140 contacts the one or more flexible snap-fit elements 716 and pushes them towards one or more buffer compartments to receive the rear face 760 of the third E1.S drive 140 in the drive compartment 734. In such examples, once the rear face 760 of the third E1.S drive 140 is received in the drive compartment 734, the one or more flexible snap-fit elements 716 snaps back and engages with one or more peripheral edge portions 159 of the third E1.S drive 140 to retain the rear face 156 of the third E1.S drive 140. Thus, the retainer cutout 738 and the one or more flexible snap-fit elements 716 together detachably connect the third E1.S drive 140 to the drive adaptor 700 to form a drive adaptor assembly 899. (It should be noted here that the card edge contacts the step-down wall for support). In such examples, when the third E1.S drive 140 is received in the drive compartment 734, the front face 146 of the third E1.S drive 140 abuts the front wall 702 of the drive adaptor 700, the protrusion 158 protrudes beyond front wall 702 of the drive adaptor 700 via the retainer cutout 738, the rear face 156 of the third E1.S drive 140 abuts the rear wall 704 of the drive adaptor 700, and the connector 148 of the third E1.S drive 140 protrudes beyond the rear wall 704 via the step-down wall 752. Although the mounting of the drive to the drive adaptor 700 is described and illustrated in relation to the third E1.S drive 140, it should be understood that the same principles apply to the mounting of the fourth and fifth E1.S drives 160 and 180 to the drive adaptor 700.

FIG. 9 depicts a perspective rear view of a drive carrier 900. It should be understood, however, that FIG. 9 is not intended to illustrate specific shapes, dimensions, or other structural details accurately or to scale, and that implementations of the drive carrier 900 may have different numbers and arrangements of the illustrated components and may also include other parts that are not illustrated. In one or more examples, the drive carrier 900 may be used to receive and carry the first E3.S drive 200 and releasably couple the first E3.S drive 200 to an electronic device. The drive carrier 900 includes a front structure 902, a first side structure 904, a second side structure 906, one or more adaptor mounting posts 908, and one or more screw holes 910.

In one or more examples, the front structure 902 has a first end 914, a second end 916, a front face 918, and a rear face 920 opposite to the front face 918. In such examples, the first side structure 904 extends perpendicularly from the first end 914 and the second side structure 906 extends perpendicularly from the second end 916, forming a substantially U-shaped structure with squared corners. In some examples, the drive carrier 900 has a drive carrier volume 922 defined between the front structure 902 and the first and second side structures 904, 906. In such examples, the drive carrier volume 922 may conform to a second volume 202 (as shown in FIG. 2A) of a first E3.S drive 200. Further, the drive carrier volume 922 may also conform to the adaptor volume 732 of the drive adaptor 700 (as shown in FIG. 7A). More specifically, the width of the drive carrier volume 922 is approximately equal to the width of each of the first E3.S drive 200 and the drive adaptor 700 so that the side structures 904 and 906 are adjacent to the first E3.S drive 200 or the drive adaptor 700 when received in the drive carrier volume 922, and also the length of the drive carrier volume 922 is approximately equal to the length of each of the first E3.S drive 200 (excluding the protruding portion such as a connector) and the length of the drive adaptor 700. In addition, a thickness of the drive carrier volume 922 is equal to or exceeds the thicknesses of each of the first E3.S drive 200 and the drive adaptor 700.

In some examples, each of the first side structure 904 and the second side structure 906 has a screw hole 910 for attachment of the drive carrier 900 to the drive adaptor 700, as described herein. The front structure 902 includes the one or more adaptor mounting posts 908 to allow the drive carrier 900 to be coupled to a front end of the drive adaptor 700. In the example of FIG. 9, one adaptor mounting post 908 is disposed at the first and second ends 914, 916 of the front structure 902. The adaptor mounting posts 908 extend from the rear face 920 of the front structure 902 and are aligned to the one or more buffer compartments 736 of the drive adaptor 300. In some examples, the drive carrier 900 is an EDSFF drive carrier having the drive carrier volume 922 that conform to that of the first E3.S drive 200 and the drive adaptor 700. In particular, each of the first and second side structures 904, 906 has a first side portion 907 and a second side portion 909 connected to the first side portion 907. In such examples, the first side portion 907 has a thickness that conforms to a 1T thickness (as indicated by the orientation legend 10) of the drive carrier 900. Similarly, each of the second side portion 909 and the front structure 902 has a thickness that conforms to a 2T thickness of the drive carrier 900. Thus, the drive carrier 900 has a 2T thickness to receive and carry the first E3.S drive 200 or the drive adaptor 700 having the third E1.S drive 140, within the drive carrier volume 922.

FIG. 10A depicts an assembled perspective rear view of a drive carrier 900 and a drive adaptor assembly 899. FIG. 10B depicts an assembled perspective front view of the drive carrier 900 and the drive adaptor assembly 899 of FIG. 10A. In the description hereinafter, FIGS. 10A-10B are described concurrently for ease of illustration. It should be understood, however, that FIGS. 10A-10B are not intended to illustrate specific shapes, dimensions, or other structural details accurately or to scale, and that implementations of a drive carrier assembly 1099 may have different numbers and arrangements of the illustrated components and may also include other parts that are not illustrated.

Since the compartment volume 744 (as labeled in FIGS. 7A-7B) conforms to that of the first volume 142 (as labeled in FIG. 1C) of the third E1.S drive 140, the third E1.S drive 140 may be received in the drive compartment 734 of the drive adaptor 700. In such examples, in the state of the third E1.S drive 140 being received in the drive compartment 734, the one or more flexible snap-fit elements 716 engage with one or more peripheral edge portions 159 of the third E1.S drive 140 and detachably connect the third E1.S drive 140 to the drive adaptor 700 to form a drive adaptor assembly 899.

Similarly, since the drive carrier volume 922 (as labeled in FIG. 9) conforms to that of the adaptor volume 732 (as labeled in FIGS. 7A-7B), the drive adaptor 700 may be received in the drive carrier 900. In such examples, when the drive adaptor 700 is disposed in the drive carrier volume 722, the front structure 902, the first side structure 904, and the second side structure 906 in conjunction receives the drive adaptor 700 such that the rear face 920 of the front structure 902 abuts the front wall 702 of the drive adaptor 700, first side structure 904 abuts the first side wall 706 of the drive adaptor 700, and the second side structure 906 abuts the second side wall 708 of the drive adaptor 700. In such examples, the protrusion 158 (as shown in FIGS. 8A-8B) protrudes beyond front wall 702 of the drive adaptor 700 via the retainer cutout 738 (as shown in FIGS. 8A-8B) and the connector 148 of the third E1.S drive 140 protrudes beyond the rear wall 704 through the step-down wall 752. The one or more adaptor mounting posts 908 (as shown in FIG. 9) extends through the one or more adaptor mounting holes 718 (as shown in FIG. 7A) to connect the front end of the drive adaptor 700 to the drive carrier 900. Further, the screw hole 910 of the drive carrier 900 is aligned with a corresponding screw insert 720 of the drive adaptor 700 to receive a screw fastener among the pair of screw fasteners 1030 and detachably connect the drive adaptor 700 to the drive carrier 900 and form a drive carrier assembly 1099.

Since each of the third and fourth E1.S drives 140, 160 may be received and retained in the drive carrier 900 that is configured for the first E3.S drive 200, through the drive adaptor 700, there is no additional requirement to design separate drive carriers for the third and fourth E1.S drives 140, 160. Accordingly, the cost, time, and labor associated with manufacturing several drive carriers specific for each of the third and fourth E1.S drives 140, 160 may be reduced. In addition, maintaining inventory of such various drive carriers for each of the third and fourth E1.S drives 140, 160 may be prevented. Further, since the drive carrier 900 for first E3.S drive 200 has a standard thickness (e.g., a 2T thickness), a storage density in a drive cage of the electronic device may be optimized to receive and carry the third and fourth E1.S drives 140, 160 having different non-standard form factors (e.g., thickness). Additionally, since the drive adaptor 700 has one or more retention elements (e.g., flexible snap-fit elements and retainer cutout) to retain the third and fourth E1.S drives 140, 160 within the drive compartment 734 of the drive adaptor 700, the third and fourth E1.S drives 140, 160 are protected against getting dislodged from the drive compartment 734.

FIG. 11A depicts a perspective rear view of an auxiliary front element 1100. FIG. 11B depicts a perspective front view of the auxiliary front element 1100 of FIG. 11A. In the description hereinafter, FIGS. 11A-11B are described concurrently for ease of illustration. The auxiliary front element 1100 includes an auxiliary front structure 1102, an auxiliary first side structure 1104, an auxiliary second side structure 1106, and one or more mounting foots 1114. In some examples, the auxiliary first side structure 1104 extends perpendicularly from a first end 1124 of the auxiliary front structure 1102, and the auxiliary second side structure 1106 extends perpendicularly from a second end 1126 of the auxiliary front structure 1102. In such examples, one mounting foot 1114 is disposed contacting the auxiliary front structure 1102 and the auxiliary first side structure 1104 and another mounting foot 1114 is disposed contacting the auxiliary front structure 1102 and the auxiliary second side structure 1106. Further, each of the one or more mounting foots 1114 includes a pass-through hole 1148. In one or more examples, the auxiliary front element 1100 may have a thickness (as indicated by the orientation legend 10) that conforms to a 1T thickness of the third E1.S drive 140. Further, the auxiliary front element 1100 has a width (as indicated by the orientation legend 10) that conforms to the width of the drive carrier 1300 (as shown in FIGS. 13A-13B) or the drive carrier 900 (as shown in FIG. 9). Further, the auxiliary front element 1100 includes electromagnetic shield elements 1108 disposed on a top surface of the auxiliary front structure 1102 and outwardly facing surface of each of the auxiliary first and second side structures 1104, 1106.

FIG. 12A depicts a perspective rear view of a drive adaptor 1200 and an auxiliary front element 1100 of FIGS. 11A-11B. FIG. 12B depicts a perspective front view of the drive adaptor 1200. In the description hereinafter, FIGS. 12A-12B are described concurrently for ease of illustration. It may be noted herein that the drive adaptor 1200 is same as a drive adaptor 700 of FIGS. 7A and 7B. Since the drive adaptor 1200 is same as the drive adaptor 700, for the sake of brevity of the disclosure, the drive adaptor 1200 is not discussed in details and such non-description of the drive adaptor 1200 should not be construed as a limitation of the disclosure. The corresponding components of the drive adaptors 700 and 1200 are given the same last two digits, such as 732 and 1232. In the description hereinafter, FIGS. 12A-12B are described concurrently for ease of illustration. Similar to the drive adaptor 700 of FIGS. 7A-7B, the drive adaptor 1200 includes one or more auxiliary mounting elements 1214 disposed in one or more buffer compartments 1136 of the drive adaptor 1200 and contacts a front wall 1202 of the drive adaptor 1200. In some examples, each of the one or more auxiliary mounting elements 1214 includes a mounting recess 1246 and a hole 1248 defined in the mounting recess 1246.

In one or more examples, the auxiliary front element 1100 is disposed on the front wall 1202 of the drive adaptor 1200 such that each mounting foot 1114 of the auxiliary front element 1100 is seated on a corresponding mounting recess 1246 of the one or more auxiliary mounting elements 1214, the auxiliary first side structure 1104 of the auxiliary front element 1100 seats on the first side wall 1206, the auxiliary second side structure 1106 of the auxiliary front element 1100 seats on the second side wall 1208, and the auxiliary front structure 1102 of the auxiliary front element 1100 seats on the front wall 1202 to form a drive adaptor and auxiliary front element assembly 1199. In such examples, the auxiliary front structure 1102 extends outwards along the length (as indicated by the orientation legend 10) to align with the front structure 1302 (as shown in FIG. 13A) of the drive carrier 1300. Further, when the auxiliary front element 1100 is disposed on the front wall 1202, the pass-through hole 1148 and the hole 1248 are aligned to each other to receive one or more assembly screws 1160. In such examples, the one or more assembly screws 1160 extends through the pass-through holes 1148 and the hole 1248 to connect the auxiliary front element 1100 to the drive adaptor 1200.

As discussed herein, a second side portion 1209 of each of the first and second side walls 1206, 1208 and the front wall 1202 of the drive adaptor 1200 together define a thickness that conforms to a 2T thickness (as indicated by the orientation legend 10) of the drive adaptor 1200. Similarly, each of the auxiliary first and second side structures 1104, 1106 and the auxiliary front structure 1102 of the auxiliary front element 1100 together define a thickness that conforms to a 1T thickness of the auxiliary front element 1100. In such examples, when the auxiliary front element 1100 is disposed on the front wall 1202 of the drive adaptor 1200, the drive adaptor and auxiliary front element assembly 1199 defines a thickness that conforms to a 3T thickness. In other words, the auxiliary front element 1100 when disposed on the drive adaptor 1200 increases the volume (e.g. thickness) of the drive adaptor 1200. Accordingly, the drive adaptor and auxiliary front element assembly 1199 has an adaptor volume 1232 and a compartment volume 1244, which may be greater than the adaptor volume 732 and the compartment volume 744 (as shown in FIGS. 7A-7B) of the drive adaptor 700. In such examples, the compartment volume 1244 conforms to a first volume 182 (as shown in FIG. 1E) of a fifth E1.S drive 180 to receive the fifth E1.S drive 180 in a drive compartment 1234 of the drive adaptor and auxiliary front element assembly 1199. In one or more examples, the compartment volume 1244 is defined by a first thickness of about 25.00 mm, a first width of about 33.75 mm, and a first length of about 106.75 mm. Similarly, the adaptor volume 1232 is defined by a second thickness of about 25.00 mm, and a second width of about 76.00 mm, and a second length of about 106.75 mm. It may be noted herein that the second width is greater than the first width. Since, the drive adaptor 1200, which is same as that of the drive adaptor 700 may be reused to accommodate or receive multiple E1.S drives (e.g., 9.50 mm or 15 mm), the cost for receiving and carrying multiple E1.S drives are significantly reduced. Similarly, the drive adaptor 1200, which is same as that of the drive adaptor 700 may be reused along with the auxiliary front element 1100 to accommodate or receive the E1.S drive (e.g., 25 mm), the cost for receiving and carrying the E1.S 25 mm drive is significantly reduced.

FIG. 13A depicts an assembled perspective rear view of a drive carrier 1300 and a drive adaptor assembly 1299. FIG. 13B depicts an assembled perspective front view of the drive carrier 1300 and the drive adaptor assembly 1299 of FIG. 6A. In the description hereinafter, FIGS. 13A-13B are described concurrently for ease of illustration.

In some examples, the drive adaptor assembly 1299 includes the drive adaptor and auxiliary front element assembly 1199 and the fifth E1.S drive 180 (as shown in FIG. 1E). As discussed herein, the drive adaptor and auxiliary front element assembly 1199 includes a drive adaptor 1200 and an auxiliary front element 1100). In some examples, the drive adaptor and auxiliary front element assembly 1199 has the drive compartment 1234 having a compartment volume 1244 (as labeled in FIGS. 12A-12B). In one or more examples, the compartment volume 1244 is defined by the first thickness of about 25.00 mm, the first width of about 33.75 mm, and the first length of about 106.75 mm. Thus, the compartment volume 1244 of the drive compartment 1234 may receive or accommodate the fifth E1.S drive 180 in the drive compartment 1234. In such examples, in the state of the fifth E1.S drive 180 being received in the drive compartment 1234, the one or more flexible snap-fit elements 1216 engage with one or more peripheral edge portions 199 of the fifth E1.S drive 180 and detachably connect the fifth E1.S drive 180 to the drive adaptor 1200 to form the drive adaptor assembly 1299.

The drive carrier 1300 is same as a drive carrier 900 of FIG. 9. Since the drive carrier 1300 is same as the drive carrier 900, for the sake of brevity of the disclosure, the drive carrier 1300 is not discussed in details and such non-description of the drive carrier 1300 should not be construed as a limitation of the disclosure. Corresponding components of the drive carriers 900 and 1300 are given the same last two digits, such as 904 and 1304.

Since a drive carrier volume 1322 of the drive carrier 1300 conforms to that of the adaptor volume 1232 (as labeled in FIGS. 12A-12B), the drive adaptor 1200 may be received in the drive carrier 1300. In such examples, when the drive adaptor 1200 is disposed in the drive carrier volume 1322, a front structure 1302 of the drive carrier 1300, a first side structure 1304 of the drive carrier 1300, and a second side structure 906 of the drive carrier 1300, in conjunction receives the drive adaptor 1200 such that a rear face 1320 of the front structure 1302 abuts the front wall 1202 of the drive adaptor 1200, first side structure 1304 abuts the first side wall 1206 of the drive adaptor 1200, and the second side structure 1306 abuts the second side wall 1208 of the drive adaptor 1200. In such examples, the protrusion 198 (as shown in FIG. 1E) protrudes beyond the front wall 1202 of the drive adaptor 1200 via the retention cutout 1238 (as shown in FIGS. 12A-12B) and the connector e.g., rear card edge connector 188 of the fifth E1.S drive 180 protrudes beyond the rear wall 1204 through the step-down wall 1252 (as shown in FIGS. 12A-12B). The one or more adaptor mounting posts 1308 (as shown in FIG. 12A) extends through one or more adaptor mounting holes (not shown) of the drive carrier 1300 to connect the front end of the drive adaptor 1200 to the drive carrier 1300. Further, the screw hole 1310 of the drive carrier 1300 is aligned with a corresponding screw insert 1220 (as shown in FIGS. 12A-12B) of the drive adaptor 1200 to receive a screw fastener among the pair of screw fasteners 1330 and detachably connect the drive adaptor 1200 to the drive carrier 1300 and form a drive carrier assembly 1399.

Since the fifth E1.S drive 180 may be received and retained in the drive carrier 1300 that is configured for the first E3.S drive 200, through the drive adaptor 300 having the auxiliary front element 1100, there is no additional requirement to design separate drive carriers for the fifth E1.S drive 180. Accordingly, the cost, time, and labor associated with manufacturing several drive carriers specific for the fifth E1.S drive 180 may be reduced. In addition, maintaining inventory of the drive carrier specific for the fifth E1.S drive 180 may be prevented.

FIG. 14 depicts a top view of a drive cage 1400 of an electronic device. The drive cage 1400 includes a plurality of guide members 1402 defining a plurality of drive bays 1404. The drive cage 1400 further includes a backplane circuit board 1450 having another connector 1488. In some examples, the drive adaptor 300 receives the second E1.S drive 120 within its drive compartment 334 (as labeled in FIG. 4) to form the drive adaptor assembly 399 (as labeled in FIG. 4). Further, the drive adaptor assembly 399 is received in the drive carrier volume 522 (as labeled in FIG. 5) of the drive carrier 500 to form the drive carrier assembly 699 (or a first drive carrier assembly). Similarly, the drive adaptor 700 receives the third E1.S drive 140 within its drive compartment 734 (as labeled in FIG. 8A) to form the drive adaptor assembly 899 (as labeled in FIG. 8B). Further, the drive adaptor assembly 899 is received in drive carrier volume 922 (as labeled in FIG. 9) of the drive carrier 900 to form the drive carrier assembly 1099 (or a second drive carrier assembly). Further, the drive adaptor and auxiliary front element assembly 1199 receives a fifth E1.S drive 180 within its drive compartment 1234 (as labeled in FIG. 13B) to form the drive adaptor assembly 1299 (as labeled in FIGS. 13A-13B). The drive adaptor assembly 1299 is received in the drive carrier volume 1322 (as labeled in FIG. 13A) of the drive carrier 1300 to form the drive carrier assembly 1399 (a third drive carrier assembly). In one or more examples, each of the first, second, and third drive carrier assemblies, 399, 1099, 1399 is slidably disposed in the drive cage 1400. In some examples, when the first drive carrier assembly 699 is slidably disposed in the drive cage 1400, the first drive carrier assembly 699 occupies one drive bay 1404. It may be noted herein that the drive carrier 300 covers or closes a front portion of the drive cage 1400 corresponding to the one drive bay 1404, thereby prevent thermal leakage and provide EMI shielding to the second E1.S drive 120. Similarly, when the second drive carrier assembly 1099 is slidably disposed in disposed in the drive cage 1400, the second drive carrier assembly 1099 occupies two drive bays 1404. It may be noted herein that the drive carrier 900 covers or closes the front portion of the drive cage 1400 corresponding to the two drive bays 1404, thereby prevent thermal leakage and provide EMI shielding to the third E1.S drive 140. Further, when the third drive carrier assembly 1399 is slidably disposed in the drive cage 1400, the third drive carrier assembly 1399 occupies three drive bays 1404. It may be noted herein that the drive carrier 1300 and the auxiliary front element 1100 covers or closes the front portion of the drive cage 1400 corresponding to the three drive bays 1404, thereby prevent thermal leakage and provide EMI shielding to the fifth E1.S drive 180.

In one or more examples, when the first, second, and third drive carrier assemblies 699, 1099, 1399 are assembled in the one or more drive bays 1404 of the drive cage 1400, the second, third, and fifth E1.S drive 120, 140, 180 respectively are coupled to the backplane circuit board 1450. In particular, the connector e.g., the rear card edge connector 128 of the second E1.S drive 120 is detachably coupled to the connector 1468 of the of the backplane circuit board 1450 to establish electrical connection there between the second E1.S drive 120 and the primary circuit board (not shown) of the electronic device via the backplane circuit board 1450. Similarly, the connector e.g., the rear card edge connector 148 of the third E1.S drive 140 is detachably coupled to the connector 1478 of the of the backplane circuit board 1450 to establish electrical connection there between the third E1.S drive 140 and the primary circuit board via the backplane circuit board 1450. Further, the connector e.g., the rear card edge connector 188 of the fifth E1.S drive 180 is detachably coupled to the connector 1488 of the backplane circuit board 1450 to establish electrical connection there between the fifth E1.S drive 180 and the primary circuit board via the backplane circuit board 1450.

FIG. 15 depicts a flowchart depicting a method 1500 of forming a drive carrier assembly. It may be noted herein that the method 1500 is described in conjunction with FIGS. 1-14, for example. The method 1500 starts at block 1502 and continues to block 1504.

At block 1504, the method 1500 includes receiving a first form factor drive (e.g., first, second, third, fourth, or fifth E1.S drive) in a drive compartment of a drive adaptor to form a drive adaptor assembly. In some examples, when the first form factor drive is received in the drive compartment, a rear face of a front wall of the drive adaptor abuts a front face of the first form factor drive and a protruding portion (e.g., a connector and/or a protrusion) of the first form factor drive extends beyond at least one of a rear wall or the front wall of the drive adaptor. In one or more examples, the drive compartment is defined within a portion of an adaptor volume, and one or more buffer compartments are defined within a remaining portion of the adaptor volume. The drive compartment includes a width that conform to a width of the first form factor drive. The method 1500 continues to block 1506.

At block 1506, the method 1500 includes retaining the first form factor drive in the drive compartment by one or more retention elements of the drive adaptor. In some examples, the one or more retention elements includes one or more flexible snap-fit elements disposed in one or more buffer compartments of the drive adaptor and facing the drive compartment. In some other examples, the one or more retention elements includes one or more threaded fasteners and one or more drive threaded holes defined in the drive compartment. The method 1500 continues to block 1508.

At block 1508, the method 1500 includes receiving the drive adaptor assembly (e.g., drive adaptor and the first form factor drive) in a drive carrier volume of a drive carrier to form a drive carrier assembly. In one or more examples, a front structure, a first side structure, and a second side structure of the drive carrier define the drive carrier volume. In such examples, when the drive adaptor assembly is received within the drive carrier volume, a rear face of the front structure of the drive carrier abuts a front face of the front wall of the drive adaptor. In some examples, a width of the drive carrier volume conforms to the width of a second form factor drive, where the width of the second form factor drive is greater than the width of the first form factor drive. The method 1500 continues to block 1510.

At block 1510, the method 1500 includes retaining the drive adaptor in the drive carrier by fastening a pair of screw fasteners through a pair of screw holes in a pair of side structures of the drive carrier and a pair of screw inserts in a pair of side walls of the drive adaptor. The method 1500 ends at block 1512.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A drive adaptor comprising:
a front wall having a first end and a second end;
a rear wall having a third end and a fourth end;
a first side wall extending between the first and third ends and a second side wall extending between the second and fourth ends to define an adaptor volume; and
a third side wall and a fourth side wall disposed between the first and second side walls and connected to the front and rear walls to define a drive compartment within a portion of the adaptor volume and one or more buffer compartments within a remaining portion of the adaptor volume, wherein each of the third and fourth side walls comprises one or more retention elements,
wherein the drive compartment is configured to receive a first form factor drive and comprises a width that conforms to a width of the first form factor drive, wherein, in a state of the first form factor drive being received in the drive compartment, the one or more retention elements retain the first form factor drive in the drive compartment, and
wherein the drive adaptor is configured to be received in a drive carrier volume of a drive carrier, wherein the drive carrier is configured to receive and hold a second form factor drive in the drive carrier volume and a width of the drive carrier volume conforms to a width of the second form factor drive, where the width of the second form factor drive is greater than the width of the first form factor drive.

2. The drive adaptor of claim 1, wherein a length of the drive compartment conforms to a length of the first form factor drive, excluding a protruding portion of the first form factor drive.

3. The drive adaptor of claim 1, wherein the drive compartment has dimensions comprising a thickness of about 7.50 mm, a width of about 33.75 mm, and a length of about 106.75 mm, and the first form factor drive has dimensions comprising a thickness of about 5.90 mm or 8.01 mm, a width of about 33.75 mm, and a length of about 111.49 mm inclusive of protruding portions or about 106.75 mm excluding a protruding portion.

4. The drive adaptor of claim 1, wherein the drive compartment has dimensions comprising a thickness of about 14.61 mm, a width of about 33.75 mm, and a length of about 106.75 mm, and the first form factor drive has dimensions comprising a thickness of about 9.50 mm or 15.00 mm or 25.00 mm, a width of about 33.75 mm, and a length of about 118.75 mm inclusive of a protruding portion or about 106.75 mm excluding a protruding portion.

5. The drive adaptor of claim 1, further comprising an auxiliary front element disposed on the front wall and coupled to one or more auxiliary mounting elements disposed in the one or more buffer compartments to increase the adaptor volume of the drive adaptor.

6. The drive adaptor of claim 1, wherein the rear wall comprises an opening to provide access to a rear end of the drive compartment, and wherein, in the state of the first form factor drive being received in the drive compartment, a connector of the first form factor drive protrudes beyond the rear wall via the opening.

7. The drive adaptor of claim 6, wherein the one or more retention elements comprise one or more threaded fasteners and one or more threaded holes defined by each of the third and fourth side walls, wherein, in the state of the first form factor drive being received in the drive compartment, the one or more threaded holes are aligned with one or more holes of the first form factor drive to receive the one or more threaded fasteners and detachably connect the first form factor drive to the drive adaptor.

8. The drive adaptor of claim 1, wherein the front wall has a retainer cutout to provide access to a front end of the drive compartment, wherein the rear wall comprises a step-down wall to provide access to a rear end of the drive compartment, wherein, in the state of the first form factor drive being received in the drive compartment: i) the retainer cutout allows a protrusion of the first form factor drive to protrude beyond the front wall and provides support to the protrusion of the first form factor drive, and ii) the step-down wall allows a connector of the first form factor drive to protrude beyond the rear wall and provides support to the connector.

9. The drive adaptor of claim 7, wherein the one or more retention elements comprise one or more flexible snap-fit elements disposed in the one or more buffer compartments and facing the drive compartment, wherein, in the state of the first form factor drive being received in the drive compartment, the one or more flexible snap-fit elements engage with one or more peripheral edge portions of the first form factor drive and detachably connect the first form factor drive to the drive adaptor.

10. A drive carrier assembly for an electronic device, comprising:
a drive adaptor comprising:
a front wall having a first end and a second end;
a rear wall having a third end and a fourth end;
a first side wall extending between the first and third ends and a second side wall extending between the second and fourth ends to define an adaptor volume; and
a third side wall and a fourth side wall disposed between the first and second side walls and connected to the front and rear walls to define a drive compartment within a portion of the adaptor volume and one or more buffer compartments within a remaining portion of the adaptor volume, wherein each of the third and fourth side walls comprises one or more retention elements,
wherein the drive compartment is configured to receive a first form factor drive and has a width that conforms to a width of the first form factor drive, wherein, in a state of the first form factor drive being received in the drive compartment, the one or more retention elements retain the first form factor drive in the drive compartment; and
a drive carrier comprising:
a front structure having a fifth end and a sixth end;
a first side structure extending perpendicularly from the fifth end; and
a second side structure extending perpendicularly from the sixth end,
wherein the front structure, first side structure, and second side structure define a drive carrier volume and the drive adaptor is received within the drive carrier volume with a rear face of the front structure abutting the front wall of the drive adaptor;
wherein a width of the drive carrier volume conforms to a width of a second form factor drive, where the width of the second form factor drive is greater than the width of the first form factor drive.

11. The drive carrier assembly of claim 10, wherein the drive compartment has dimensions comprising a thickness of about 7.50 mm, a width of about 33.75 mm, and a length of about 106.75 mm, and the first form factor drive has dimensions comprising a thickness of about 5.90 mm or 8.01 mm, a width of about 33.75 mm, and a length of about 111.49 mm inclusive of a protruding portion or about 106.75 mm excluding a protruding portion.

12. The drive carrier assembly of claim 10, wherein the drive compartment has dimensions comprising a thickness of about 14.61 mm, a width of about 33.75 mm, and a length of about 106.75 mm, and the first form factor drive has dimensions comprising a thickness of about 9.50 mm or 15.00 mm or 25.00 mm, a width of about 33.75 mm, and a length of about 118.75 mm inclusive of a protruding portion or about 106.75 mm excluding a protruding portion.

13. The drive carrier assembly of claim 10, further comprising an auxiliary front element disposed on the front wall and coupled to one or more auxiliary mounting elements disposed in the one or more buffer compartments to increase the adaptor volume of the drive adaptor.

14. The drive carrier assembly of claim 12, wherein the drive compartment and the one or more buffer compartments are arranged in the adaptor volume such that, in the state of the first form factor drive being received in the drive compartment, a connector of the first form factor drive is aligned with another connector of an electronic component of the electronic device.

15. The drive carrier assembly of claim 10, wherein the rear wall comprises an opening to provide access to a rear end of the drive compartment, and wherein, in the state of the first form factor drive being received in the drive compartment, a connector of the first form factor drive protrudes beyond the rear wall via the opening.

16. The drive carrier assembly of claim 15, wherein the one or more retention elements comprise one or more threaded fasteners and one or more threaded holes defined by each of the third and fourth side walls, wherein, in the state of the first form factor drive being received in the drive compartment, the one or more threaded holes are aligned with one or more holes of the first form factor drive to receive the one or more threaded fasteners and detachably connect the first form factor drive to the drive adaptor.

17. The drive carrier assembly of claim 10, wherein the front wall has a retainer cutout to provide access to a front end of the drive compartment, wherein the rear wall comprises a step-down wall to provide access to a rear end of the drive compartment, wherein, in the state of the first form factor drive being received in the drive compartment: i) the retainer cutout allows a protrusion of the first form factor drive to protrude beyond the front wall and provides support to the protrusion of the first form factor drive, and ii) the step-down wall allows a connector of the first form factor drive to protrude beyond the rear wall and provides support to the connector.

18. The drive carrier assembly of claim 17, wherein the one or more retention elements comprise one or more flexible snap-fit elements disposed in the one or more buffer compartments and facing the drive compartment, wherein, in the state of the first form factor drive being received in the drive compartment, the one or more flexible snap-fit elements engage with one or more peripheral edge portions of the first form factor drive and detachably connect the first form factor drive to the drive adaptor.

19. The drive carrier assembly of claim 10, further comprising a pair of screw fasteners, wherein the front wall comprises one or more adaptor mounting holes, wherein each side wall of the first and second side walls comprises a screw insert, wherein each of the first side structure and the second side structure comprises a screw hole, wherein the front structure comprises one or more adaptor mounting posts, and wherein, in the state of the drive adaptor being received in the drive carrier: i) the one or more adaptor mounting posts is connected to the one or more adaptor mounting holes, and ii) the screw hole is aligned with a corresponding screw insert to receive a screw fastener among the pair of screw fasteners and detachably connect the drive adaptor to the drive carrier.

20. A method of forming a drive carrier assembly, comprising:
  receiving a first form factor drive in a drive compartment of a drive adaptor such that a rear face of a front wall of the drive adaptor abuts a front face of the first form factor drive and a protruding portion of the first form factor drive extends beyond at least one of a rear wall or the front wall of the drive adaptor,
  wherein the drive compartment is defined within a portion of an adaptor volume, and one or more buffer compartments are defined within a remaining portion of the adaptor volume and wherein the drive compartment comprises a width that conforms to a width of the first form factor drive;
  retaining the first form factor drive in the drive compartment by one or more retention elements of the drive adaptor;
  receiving the drive adaptor in a drive carrier volume of a drive carrier such that a rear face of a front structure of the drive carrier abuts a front face of the front wall of the drive adaptor, wherein a width of the drive carrier volume conforms to a width of a second form factor drive, where the width of the second form factor drive is greater than the width of the first form factor drive; and
  retaining the drive adaptor in the drive carrier by fastening a pair of screw fasteners through a pair of screw holes in a pair of side structures of the drive carrier and a pair of screw inserts in a pair of side walls of the drive adaptor.

* * * * *